(12) United States Patent
Okimura et al.

(10) Patent No.: US 9,194,454 B2
(45) Date of Patent: Nov. 24, 2015

(54) ROTATIONAL DAMPER AND VEHICLE SEAT WITH ROTATIONAL DAMPER

(75) Inventors: Akihiko Okimura, Kanagawa (JP); Naohiro Horita, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 13/825,044

(22) PCT Filed: Jul. 6, 2011

(86) PCT No.: PCT/JP2011/065452
§ 371 (c)(1),
(2), (4) Date: Apr. 17, 2013

(87) PCT Pub. No.: WO2012/039182
PCT Pub. Date: Mar. 29, 2012

(65) Prior Publication Data
US 2013/0328342 A1 Dec. 12, 2013

(30) Foreign Application Priority Data

Sep. 22, 2010 (JP) .................................. 2010-211581

(51) Int. Cl.
*F16F 9/14* (2006.01)
*B60N 2/36* (2006.01)
*B60N 2/20* (2006.01)
*B60N 2/22* (2006.01)

(52) U.S. Cl.
CPC . *F16F 9/145* (2013.01); *B60N 2/20* (2013.01); *B60N 2/22* (2013.01); *B60N 2/36* (2013.01)

(58) Field of Classification Search
CPC ............. F16F 9/145; B60N 2/20; B60N 2/22; B60N 2/36

USPC .............. 296/66; 188/275; 297/354.12, 378.1
See application file for complete search history.

(56) References Cited

U.S. PATENT DOCUMENTS

| | | | |
|---|---|---|---|
| 2,004,910 A | 6/1935 | Fieldman | |
| 5,810,129 A * | 9/1998 | Hanawa et al. | ............... 188/308 |
| 2011/0121622 A1* | 5/2011 | Okimura et al. | ......... 297/216.12 |

FOREIGN PATENT DOCUMENTS

| | | |
|---|---|---|
| FR | 1009275 | 5/1952 |
| JP | 2001050326 A | 2/2001 |

(Continued)

OTHER PUBLICATIONS

International Search Report for PCT/JP2011/065452, issued on Sep. 28, 2011.

(Continued)

*Primary Examiner* — Glenn Dayoan
*Assistant Examiner* — Melissa A Black
(74) *Attorney, Agent, or Firm* — Stetina Brunda Garred & Brucker

(57) ABSTRACT

A rotational damper 10 comprising: a casing 13 provided therein with a partition wall portion 12 provided with a flow path 11; a rotation body 16 rotatably disposed within the casing and provided with a pair of rotary vanes 14, 15 for partitioning the inside of the casing into two chambers R1, R2, in corporation with the casing; a viscous fluid L contained within the casing; lip seals 17 mounted to the pair of rotary vanes in such a manner that, only when the rotation body rotates and moves in one direction, the lip seals 17 expand in the direction perpendicular to the vertical direction to prevent the viscous fluid from flowing between the two chambers; and a lid body 18 for closing the opening of the casing.

20 Claims, 14 Drawing Sheets

(56) References Cited

FOREIGN PATENT DOCUMENTS

| JP | 2003056620 A | 2/2003 |
|---|---|---|
| JP | 2007198444 A | 8/2007 |

OTHER PUBLICATIONS

Supplementary European Search Report for Application No. EP11826628, issued on Aug. 10, 2014, 8 pages, Munich Germany.

\* cited by examiner

[FIG. 12]
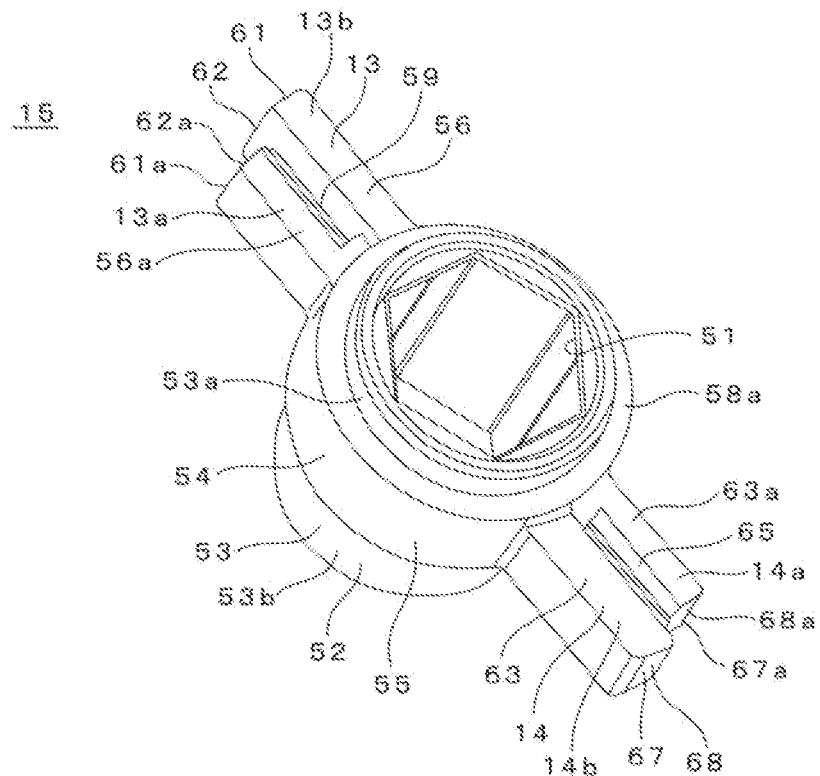
[FIG. 13]
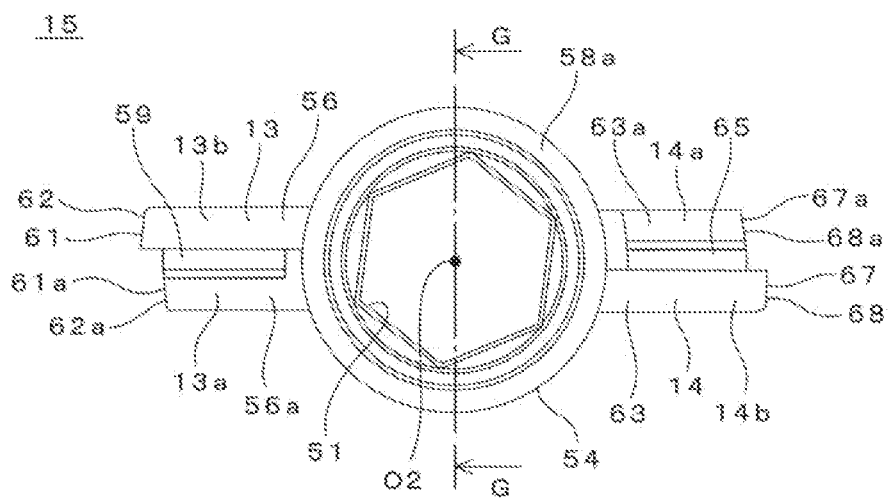

ROTATIONAL DAMPER AND VEHICLE SEAT WITH ROTATIONAL DAMPER

CROSS-REFERENCE TO RELATED APPLICATIONS

The present application claims priority to International Application No. PCT/JP2011/065452 filed Jul. 6, 2011, which claims priority to Japanese Patent Application No. 2010-211581 filed Sep. 22, 2010.

STATEMENT RE: FEDERALLY SPONSORED RESEARCH/DEVELOPMENT

Not Applicable

BACKGROUND OF THE INVENTION

1. Technical Field of the Invention

The present invention relates to a rotational damper and a vehicle seat with the rotational damper that adds a predetermined braking force to a controlled object, which performs a rotating motion, such as a vehicle seat to buffer the rotating motion.

2. Description of the Related Art

As a vehicle seat for automobiles or the like are, as shown in FIG. 31, a reclining device, which is mainly mounted on a front seat 4 side, for connecting a seat cushion (seat side) 1 and a seat back (back side) 2 with each other by a hinge mechanism 3 and making the seat back 2 tiltable at a predetermined angle in a longitudinal direction of the vehicle to fix the seat back 2 at a desired tilt angle, and a double fall-down seat, which is mainly mounted on a rear seat 8 side, in which a seat cushion 1A is connected to a hinge mechanism 6 fixed to the vehicle body floor 5 at a forward lower portion thereof, and the seat cushion 1A is risen substantially 90 degree as indicated by chain lines 1A1 with the hinge mechanism 6 as a supporting point, further the seat cushion 1A is inverted 180 degree upside down as indicated by chain lines 1A2, and a seat back 2A, which is connected to a hinge mechanism 7 fixed to the vehicle body floor 5, is risen substantially 90 degree, or folding the seat back 2A forward into a space position of the seat cushion 1A that is inverted substantially 180 degree upside down as indicated by chain lines 2A1 to widen a luggage's space, and further a single fall-down seat in which a seat back 2A, which is connected to the hinge mechanism 7 fixed to the vehicle body floor 5, is pushed forward on the seat cushion 1A side.

Meanwhile, releasing fixation of the seat back 2 or 2A that is in standing position causes the seat back 2 or 2A to rapidly rotate and tilt forward due to urging force of a return spring (spiral spring) mounted to the hinge mechanism 3 or 7, and when the seat cushion 1A is inverted about 180 degree upside down from a standing position of about at 90 degree, the seat cushion 1A rapidly rotates and tilts due to urging force of a return spring disposed in the hinge mechanism 6. For instance, releasing the fixation of the seat back 2 or 2A when infants seat thereon as they are may cause large damage to the infants, such as catching of their bodies, or there may be damages of articles laid on the seat cushion 1 or 1A.

To solve the above problems, conventionally, it is proposed a construction in which a rotating damper (rotational damper) that acts to add a predetermined braking force to a controlled object such as a seat back of a vehicle seat and so on with rotational motion and to make the rotational motion thereof to be slow, which prevents rapid rotation and tilting of the controlled objects, is mounted to the above hinge mechanism, or a construction in which an oil damper or an air damper is mounted between a seat cushion and a seat back (Patent documents 6 and 7).

The rotational damper mounted to the hinge mechanism generates fluid resistance force by rotation of vanes (rotary vanes), which are disposed in a fluid chamber (casing) in which viscous fluid is stored. As these rotational dampers, there are one way rotational dampers (Patent documents 1 to 5) having a check valve such that vanes thereof provide braking force only in one way, and bidirectional rotational dampers that are constructed without a check valve and can provide braking forces regardless of rotational direction.

In this kind of rotational damper, fluid resistance force that is generated when fluid pressed by rotation of vanes flows through a small gap between the vanes and an inner peripheral wall of a fluid chamber makes rotational movement of a controlled object slow to avoid shocking contact to fixed members of the controlled object.

Therefore, magnitude of the braking force provided by the rotational dampers can be changed by making the gap through which the viscous fluid flows changeable. More specifically, the larger the gap through which viscous fluid flows is made, the smaller the fluid resistance of the viscous fluid becomes, so that braking force can be smaller, and the smaller the gap through which viscous fluid flows is made, the larger the fluid resistance of the viscous fluid becomes, resulting in larger braking force.

Patent document 1: Japanese Patent Publication No. 2006-242318 gazette

Patent document 2: Japanese Patent Publication No. Heisei 4-282039 gazette

Patent document 3: Japanese Patent Publication No. Heisei 5-52228 gazette

Patent document 4: Japanese Patent Publication Heisei 5-263847 gazette

Patent document 5: Japanese Patent Publication No. Heisei 7-301272 gazette

Patent document 6: Japanese Utility Model Publication No. Heisei 5-34940 gazette Patent document 7: Japanese Utility Model Publication No. Heisei 7-265148 gazette In the damper disclosed in the above Patent document 1, there is a problem that unless a rotor main body, pieces of a vane, and a control valve relatively largely shift in positions in relation to each other a switching passage through which viscous fluid flows does not open and close. In addition, in the dampers disclosed in the Patent documents 2 to 5, a pair of vanes are attached to a rotor so as to radially extend from the rotor; a control valve is formed to have C-shaped cross section; and movement of the control valve is made large to constitute an one-way damper, so that a migration length of the control valve to the vane becomes long when switching from braking condition to non-braking condition or from non-braking condition to braking condition, resulting in poor response.

The present invention has been made in consideration of the above circumstances, and the object thereof is to provide a rotational damper and a vehicle seat with the rotational damper for exerting braking action only in one direction with excellent response.

BRIEF SUMMARY OF THE INVENTION

To achieve the above object, a rotational damper of the present invention includes; a casing having a pair of partition portions opposing with each other therein; a rotation body rotatably arranged in the casing and having a pair of rotary vanes that divide each chamber between the partition portions in the casing into two chambers in corporation with the casing; a viscous fluid stored in the casing; a lid body for closing an opening of the casing; a lip seal attached to each of the pair of rotary vanes, and constantly brought into slide contact with the casing and the lid body; an orifice groove formed on the partition portion, and allowing the viscous fluid to flow into each of the chambers between the partition portions therethrough; and a check valve mechanism acting to brake rapid rotational movement of the rotation body only in one direction of the rapid rotational movement of the rotation body.

With the rotational damper according to the present invention, in accordance with a rapid one way rotational movement of the rotation body, the pair of rotary vanes integrally formed with the rotation body perform rotational movements also, and the rotational movements of the rotary vanes cause the check valve mechanisms formed on the partition portions to act to prevent the viscous fluid flowing through the partition portions from flowing, so that the viscous fluid flows through the orifice grooves. At this moment, the lip seals mounted to the rotary vanes receive fluid resistance of the viscous fluid and expands outward, so that the lip seals closely slidably contact with the casing and the lower surface of the lid body, which prevents the viscous fluid from flowing at these portions. When the viscous fluid flows through the orifice groove, large viscous resistance of the viscous fluid acts to the rotary vanes, so that rapid one way rotational movement of the rotation body is prohibited and the rotation body slowly rotates and moves, so that the rotational damper having the check valve mechanisms formed on the partition portions and the lip seals mounted to the check valve mechanisms is excellent in response.

When the casing and the lid body, with which the lip seal slidably contact, are mode from metal such as aluminum, aluminum alloy, zinc or zinc alloy, usually used die-casting, and as-cast products are used. Further, in case that the casing and the lid body are mode from thermoplastic synthetic resin or thermoplastic synthetic resin containing a reinforcement base material, injection molded products are used as they are. However, in the casing and the lid body of the as-cast products or the injection molded products, shrinkage, sink and so on based on differences in wall thickness and others at an upper surface of an annular bottom portion of the casing, a lower surface of the lid body, and a cylindrical inner peripheral face of a cylindrical standing wall portion, resulting in difficulty in obtaining flatness. Although it is possible to accurately form flatness through machining or the like after the casting or the molding, it is obliged to considerable increase in manufacturing cost.

Since flexibility in deformation is given to the lip seals mounted to the rotary vanes so as to closely slide along the upper surface of the annular bottom portion of the casing, the lower surface of the lid body, and the cylindrical inner peripheral face of the cylindrical standing wall portion with bad flatness when slidably contacting with those faces, so that it is unnecessary to apply machining and so on to the upper surface of the annular bottom portion of the casing, the lower surface of the lid body, and the cylindrical inner peripheral face of the cylindrical standing wall portion of the casing, which slidably contact with the lip seal, resulting in considerable reduction in manufacturing cost of the rotational damper.

In the rotational damper of the present invention, to each of the pair of rotary vanes is formed an elongate locking groove on upper and lower surfaces thereof along longitudinal direction so as to divide the rotary vane in two pieces; a height from an upper surface to a lower surface of one of the divided rotary vanes is lower than a height from upper surface to a lower surface of another rotary vane, and longitudinal length of the one of the divided rotary vane is shorter than that of the other divided rotary vane, and the lip seal is engaged with and mounted to the elongate locking grooves so as to cover the upper and lower surfaces and an end face of the rotary vane and can be opened and closed in a vertical direction of the rotary vane.

The above rotational damper can be constructed such that: the lip seal includes a first seal piece of generally square shape, and a pair of second seal pieces that are connected to both corner portions of a lower end of the first seal piece, wherein an inner surface of the first seal piece shapes an arcuate recessed face; an outer surface thereof shapes an arcuate projecting face; each of the second seal pieces includes a plate-like portion that is shaped like a rectangle, a standing wall portion integrally formed with an end portion on a side of one long side of the plate-like portion along a longitudinal direction thereof, and an arcuate recessed face formed between an end face of one short side of the plate-like portion and an end face that continues the end face on a side of the standing wall portion; an end portion on a side of another long side of the plate-like portion expands toward outside of a locking planar portion of the standing wall portion; and the plate-like portions of the second seal piece face each other and are connected to both corners of a lower end of the first seal piece at an end portion of the standing wall portion.

In addition, the lip seal can be mounted to the rotary vane such that: standing wall portions of the second seal pieces are engaged with locking longitudinal grooves formed on upper and lower surfaces of the one rotary vane and locking longitudinal grooves formed on upper and lower surfaces of the other rotary vane of the pair of rotary vanes respectively; arcuate recessed faces formed over an end face on the side of a short side of a plate-like portion and an end face of the standing wall portion continuing the end face are engaged with an outer circumferential face of a band-like cylindrically projecting portion of the rotation body; and an arcuate recessed faces on the inner surface of the first seal piece is engaged with an arcuate projecting face on the end face of the rotary vane and the arcuate projecting face on the end face of the rotary vane; and an arcuate projecting face of the outer face of the first seal piece and an arcuate projecting face on the end face of the rotary vane, and the arcuate projecting face on an end face of the arcuate projecting face of the rotary vane are formed to be continuous arcuate projecting faces.

In the rotational damper of the present invention, the check valve mechanism may include a curved concave groove formed on each of the pair of partition portions, and a check valve engaged with the curved concave groove so as to be movable along the curved concave groove, and the curved concave groove may include an inner curved convex wall face, an outer curved concave wall face, and a bottom wall face; one end portion of the curved concave groove is recessed in a circumferential direction more than one end portion of the partition portion; and the curved concave groove has a standing wall face perpendicular to the inner curved convex wall face and the outer curved concave wall face and a pair of locking projecting portions for narrowing an opening of the curved concave groove at an end portion on the standing wall face side of the curved concave groove The check valve composing the check valve mechanism may include: a band-plate-like base portion having an inner curved concave face portion and an outer curved convex face portion that are curved with a same curvature center on both sides of one face in a longitudinal direction thereof; a standing wall portion standing on one end portion of one face of the base portion along a width direction; a pair of projecting portions standing on another end portion of the one face of the base portion so as to oppose with each other in a width direction; and an even flat face portion formed on another face in a longitudinal direction.

In the rotational damper according to the present invention, the check valve mechanism can be constructed such that: the inner curved concave face portion of the band-plate-like base portion of the check valve slidably contacts with the inner curved convex wall face of the curved concave groove of the partition portion; the outer curved convex face portion slidably contacts with the outer curved concave wall face of the curved concave groove of the partition portion; the standing wall portion covers and contacts with end faces of a pair of locking projecting portions of the curved concave groove of the partition portion; and an even flat face portion is flush with an upper surface of the partition portion and is engaged with the curved concave groove of the partition portion.

A vehicle seat having the rotational damper of the present invention is a vehicle seat in which a reclining mechanism is attached to one of connection portions for connecting a seat back and a seat, which are disposed on both sides in a width direction and mainly used as a front seat, and on the other side of the connection portions for connecting the seat back and the seat on both sides in a width direction is mounted a rotational damper for braking rapid tilting speed of the seat back at a forward tilting of the seat back, and this rotational damper becomes the rotational damper described above.

In addition, another vehicle seat with the rotational damper of the present invention is a double fall-down seat, in which a seat cushion is connected to a hinge mechanism fixed to a vehicle body floor at a forward lower portion thereof, and the seat cushion is risen substantially 90 degree with the hinge mechanism as a supporting point, further the seat cushion is inverted 180 degree upside down, and a seat back, which is connected to a hinge mechanism fixed to the vehicle body floor, is risen substantially 90 degree, or folding the seat back forward into a space position of the seat cushion that is inverted substantially 180 degree upside down to widen a luggage's space, and to the hinge mechanism of the seat cushion and to the hinge mechanism of the seat back tilting forward is mounted a rotational damper for braking rapid tilting speed of the seat back at a forward tilting of the seat back, and this rotational damper becomes the rotational damper described above.

Still further, another vehicle seat with the rotational damper of the present invention is a single fall-down seat in which a seat back, which is connected to the hinge mechanism fixed to the vehicle body floor, is pushed forward on the seat cushion side, and to the hinge mechanism of the seat back tilting forward is mounted a rotational damper, and this rotational damper becomes the rotational damper described above.

With the vehicle seats with the rotational damper according to the present invention, the seat back is constructed in such a manner as to be allowed to tilt in a back and forth direction of the seat back due to releasing the lock and to be supported at a desired angle position. And, releasing the lock of the seat back at a standing position allows the seat back to rapidly incline forward due to urging force of a spiral spring. At this moment, the rotational damper, which is engaged on the seat back side in the casing and is fixed in the casing to the hinge mechanism, acts to prevent rapid tilting by braking forward tilting speed of the seat back, so that the seat back rapidly tilts forward.

More specifically, relative rotation is generated between the casing of the rotational damper engaged on the seat back side and the rotation body of the rotational damper fixed to the rotational pivot of the hinge mechanism. The seat back rapidly tilts forward due to urging force of the spiral spring, and the rotation body of the rotational damper fixed to the rotational pivot of the hinge mechanism rotates and moves. This rotational movement of the rotation body allows a pair of rotary vanes that are integrally formed with the rotation body to rotate also, and the rotational movement of the rotary vanes causes the check valve mechanism formed on the partition portions to act to prevent flow of the viscous fluid flowing through the partition portions, so that the viscous fluid is caused to flow through the orifice grooves. At this moment, the lip seals mounted to the rotary vanes receive fluid resistance of the viscous fluid and expands outward, so that the lip seals closely slidably contact with the casing and the lower surface of the lid body, which prevents the viscous fluid from flowing at these portions. When the viscous fluid flows through the orifice groove, large viscous resistance of the viscous fluid acts to the rotary vanes, so that rapid rotational movement of the rotation body is prohibited, which allows the seat back to slowly be tilt forward.

On the contrary, when the seat back is risen from a position inclined forward to a standing position, in accordance with the rotational movement of the rotation body, a pair of rotary vanes rotatably move also. With the rotational movement of the pair of rotary vanes, the check valve mechanism acts to allow the viscous fluid to flow through the partition portions, and the rotation body rapidly rotates while receiving little viscous resistance of the viscous fluid, which makes it possible to rapidly return the seat back, which is supported by the rotational pivot to which the rotation body is inserted an fitted, to the standing position.

With the present invention, in accordance with one way rapid rotational movement of a rotation body, a pair of rotary vanes, which are integrally formed with the rotation body, rotatably move also; the rotational movements of the rotary vanes cause check valve mechanisms to act and lip seals mounted to the rotary vanes expand outward so as to closely slidably contact with the casing and the lid body, which prevents flow of the viscous fluid in two chambers divided by the rotary vanes; the action of the check valve mechanisms prohibits flow of the viscous fluid that flows through the partition portions; and the viscous fluid is allowed to flow through orifice grooves, when flowing through the orifice grooves, to the orifice grooves acts large resistance force of the viscous fluid to prevent one way rapid rotational movement of the rotation body, providing a rotational damper and vehicle seats with the rotational damper that are remarkably excellent in response.

BRIEF DESCRIPTION OF THE DRAWINGS

FIG. 12 is a perspective view of a rotation body of the rotational damper according to the present invention.

FIG. 13 is a plan view of the rotation body shown in FIG. 12.

DETAILED DESCRIPTION OF THE INVENTION

Figure 1:
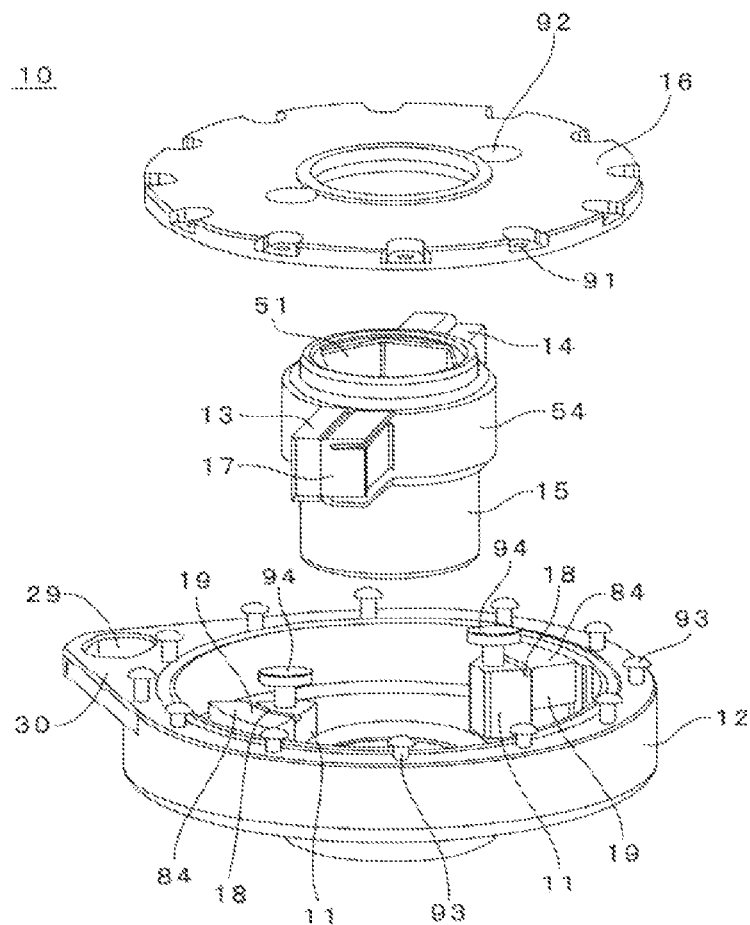
FIG. 1 is an exploded perspective view showing a rotational damper according an embodiment of the present invention.
Figure 2:
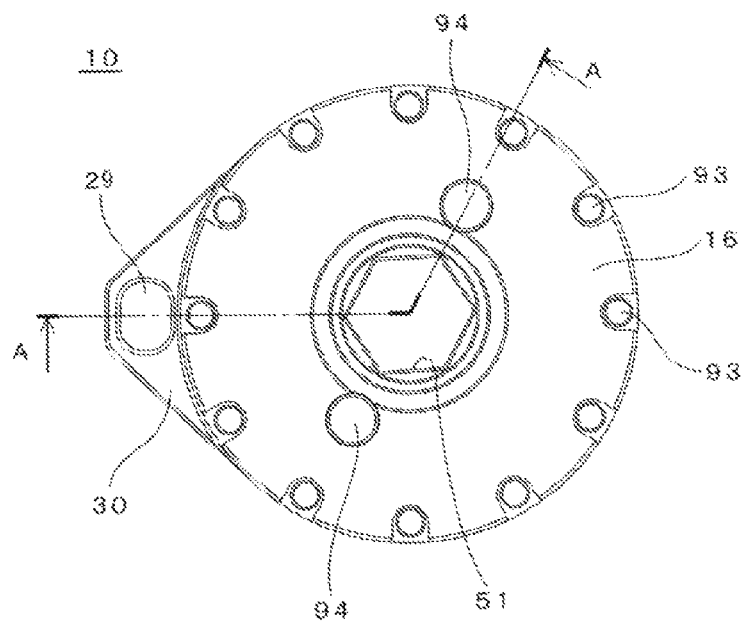
FIG. 2 is a plan view of the rotational damper according to the present invention.

Next, the present invention will be explained based on examples of preferred embodiments shown in the figures. The present invention is not limited by these embodiments.

As shown in FIGS. 1 to 5, a rotational damper 10 according to the present invention is characterized by including: a casing 12 having a pair of partition portions 11, 11 therein; a rotation body 15 rotatably arranged in the casing 12 and having a pair of rotary vanes 13, 14 that divide each chamber between the partition portions 11, 11 in the casing 12 into two chambers in corporation with the casing 12, a viscous fluid L stored in the casing 12; and a lid body 16 for closing an opening of the casing 12, and to each of the rotary vanes 13, 14 is attached a lip seal 17 that is constantly brought into slide contact with the casing 12 and the lid body 16, and on each of the partition portions 11, 11 is formed an orifice groove that allows the viscous fluid L to flow into each of the chambers between the partition portions 11, 11 therethrough, and a check valve mechanism 19 acting to brake rapid rotational movement of the rotation body 15 only in one direction of the rapid rotational movement of the rotation body 15.

The casing 12 of the rotational damper 10 is, as shown in FIGS. 6 to 10, provided with a cylindrical standing wall portion 21 with an annular bottom portion 20; a cylindrically projecting portion 23 formed so as to project on a central portion of a lower surface 22 of the annular bottom portion 20; an insertion hole 24 formed on an inner surface of the cylindrically projecting portion 23; a through hole 27 whose diameter is enlarged from the insertion hole 24 via an annular shoulder portion 25 and opens on an upper surface of the annular bottom portion 20; a mounting ear portion 30 with a through hole 29 that is formed so as to project on an outer annular surface 28 of the cylindrical standing wall portion 21 outwardly in a radial direction; an annular recessed groove 33 formed on an end face 31 of the cylindrical standing wall portion 21 so as to enclose an opening 32 of the cylindrical standing wall portion 21; and an annular concave portion 34 formed on an inner surface of the insertion hole 24.

In addition, in the casing 12, a pair of partition portions 11, 11, which oppose with each other with the center O1 of the insertion hole 24 between them and are shaped like a fan in plan view in such a manner that the pivot side is directed to the center O1, are integrally formed with a portion between an upper surface 26 of the annular bottom portion 20 and a cylindrical inner peripheral face 35 of the cylindrical standing wall portion 21, and to tip portions 36, 36 of the partition portions 11, 11 are formed arcuate recessed faces 37, 37 whose diameters are larger than that of the through hole 27 with the center thereof is the center O1.

On the upper surfaces 38, 38 of the partition portions 11, 11 are formed curved concave grooves 39, 39 having the same curvature center (the center O1) as the cylindrical inner peripheral face 35 of the cylindrical standing wall portion 21, and the curved concave grooves 39, 39 are provided with inner curved convex wall faces 40, 40, outer curved concave wall faces 41, 41, and curved bottom wall faces 42, 42. End portions 43, 43 of the curved concave grooves 39, 39 in a counterclockwise direction are formed so as to be dented in a circumferential direction in comparison to end portions 44, 44 of the partition portions 11, 11 on one side, and are vertical wall faces 45, 45 that are perpendicular to the inner curved convex wall faces 40, 40 and the outer curved concave wall faces 41, 41.

On a counterclockwise end portion 43 of the curved concave groove 39 are formed a pair of locking projecting portions 46, 46 that narrow an opening of the end portion 43 of the curved concave groove 39 so as to project on the inner curved convex wall face 40 and the curved bottom wall face 42 as well as the outer curved concave wall face 41 and the curved bottom wall face 42, and end faces 47, 47 of the locking projecting portions 46, 46 are flush with the vertical wall faces 45, 45, and heights of the locking projecting portions 46, 46 from the curved bottom wall face 42 to the upper surfaces 48, 48 are lower than height of the partition portion 11 from the upper surface 26 of the annular bottom portion 20 to the upper surface 38 of the partition portion 11.

The inner curved convex wall face 40 of the curved concave groove 39 is in communication with the notched groove 49 formed on the upper surface 38 of the partition portion 11, and on the end face 31 of the cylindrical standing wall portion 21 of the casing 12 is formed a plurality of screw holes 31a, 31a along a circumferential direction outside of the annular concave groove 33 that is formed on the end face 31, in addition, on the upper surfaces 38 of the partition portions 11, 11 on the tip portions 36, 36 side are formed screw holes 50, 50.

The casings 12 with the above construction and the pair of partition portions 11, 11 that are integrally formed with an inner portion of the cylindrical standing wall portion 21 of the casings 12 are made by die-casting method using aluminum, aluminum alloy, zinc or zinc alloy, or injection-molding method using synthetic resin or synthetic resin containing a reinforcement base material.

Figure 3:
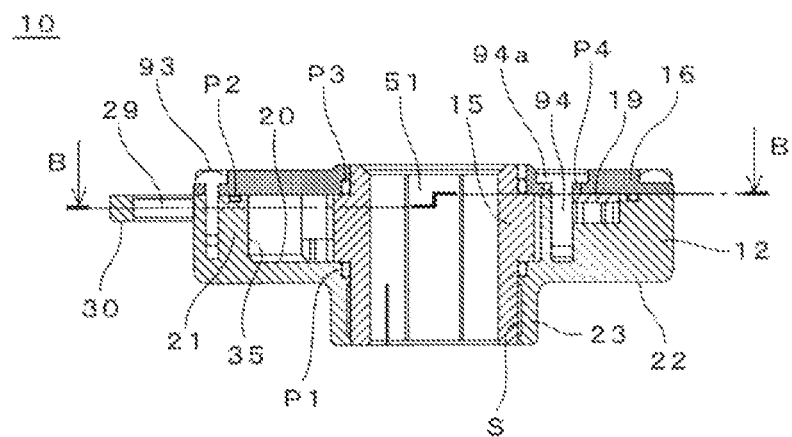
FIG. 3 is a cross-sectional view taken along the line A-A of FIG. 2.

To the annular concave portion 34 that is formed on the inner surface of the insertion hole 24 of the cylindrically projecting portion 23 of the above casing 12 is inserted a slide bearing S (refer to FIG. 3). As this slide bearing S is, for example, preferably used a slide bearing made from thermoplastic synthetic resins such as polyacetal resins.

The rotation body 15 is, as shown in FIGS. 12 to 19, provided with an angle hole 51 (a hexagonal hole in this embodiment) on an inner surface thereof; a cylindrical base body 53 with a cylindrical face 52 on an outer surface thereof; a band-like cylindrically projecting portion 54 integrally formed with the outer cylindrical face 52 of the cylindrical base body 53 while remaining a cylindrical base body portion 53a with a predetermined width on the upper end side of the cylindrical base body 53 and remaining a cylindrical base body portion 53b with a predetermined width on the lower end side of the cylindrical base body 53; and a pair of rotary vanes 13, 14 that are formed so as to project on the outer circumferential face 55 of the band-like cylindrically projecting portion 54 while opposing with each other in an outer and radial direction with the center O2 of the angle hole 51 between them.

The upper surface 56 and the lower surface 57 of the rotary vane 13, which is one of the pair of rotary vanes 13, 14, are provided with tiered portions t in an axial direction against an upper end face 58a and a lower end face 58b of the band-like cylindrically projecting portion 54 of the rotation body 15, and on the upper surface 56 and the lower surface 57 of a rotary vane 13 are formed locking longitudinal grooves 59, 60, which are rectangularly shaped when observed from upside, along a longitudinal direction so as to open on the end face 61 side of the rotary vane 13. The height h1 of a rotary vane 13a, which is one of rotary vanes 13a, 13b divided by the locking longitudinal grooves 59, 60, from an upper surface 56a to a lower surface 57a is formed to be lower than the height h2 of the other rotary vane 13b from the upper surface 56 to the lower surface 57 (h1<h2). In addition, the length l1 of the one rotary vane 13a in a radial direction is formed to be shorter than the length l2 of the other rotary vane 13b in a radial direction (l1<l2), and an end face 61a of the rotary vane 13a and the end face 61 of the rotary vane 13b are formed on arcuate projecting faces 62, 62a. The arcuate projecting face 62, which is formed on the end face 61 of the rotary vane 13b, is formed to have the same curvature as the cylindrical inner peripheral face 35 so as to slidably contact with the cylindrical inner peripheral face 35 of the cylindrical standing wall portion 21 of the casing 12.

In the same manner, the upper surface 63 and the lower surface 64 of the rotary vane 14, which is one of the pair of rotary vanes 13, 14, are provided with tiered portions t in an axial direction against the upper end face 58a and the lower end face 58b of a band-like cylindrically projecting portion 54 of the rotation body 15, and on the upper surface 63 and the lower surface 64 of the rotary vane 14 are formed locking longitudinal grooves 65, 66, which are rectangularly shaped when observed from upside, along a longitudinal direction so as to open on the end face 67 side of the rotary vane 13. The height h1 of a rotary vane 14a, which is one of rotary vanes 14a, 14b divided by the locking longitudinal grooves 65, 66, from an upper surface 63a to the lower surface 64a is formed to be lower than the height h2 of the other rotary vane 14b from the upper surface 63 to the lower surface 64 (h1<h2). In addition, the length l1 of the one rotary vane 14a in a radial direction is formed to be shorter than the length l2 of the other rotary vane 14b in a radial direction (l1<l2), and an end face 67a of the rotary vane 14a and the end face 67 of the rotary vane 14b are formed on arcuate projecting faces 68, 68a. The arcuate projecting face 68, which is formed on the end face 67 of the rotary vane 14b, is formed to have the same curvature as the cylindrical inner peripheral face 35 so as to slidably contact with the cylindrical inner peripheral face 35 of the cylindrical standing wall portion 21 of the casing 12.

The rotation body 15 is arranged in the casing 12 in such a manner that the outer peripheral cylindrical face 52 of the cylindrical base body 53 is inserted into the insertion hole 24 on the inner surface of the cylindrically projecting portion 23 of the casing 12 through the slide bearing S, which is inserted and fitted to the annular concave portion 34 of the insertion hole 24, and is disposed in the casing 12 while the lower end face 58b of the band-like cylindrically projecting portion 54 of the rotation body 15 closely contacting with an O-ring P1 made of rubber resilient body, which is inserted and fitted to the annular shoulder portion 25 for allowing the insertion hole 24 and the through hole 27 to be in communication with each other.

The rotation body 15 that is integrally formed with the pair of rotary vanes 13, 14 with the above construction is preferably formed by injection-molding from thermoplastic synthetic resins such as polyacetal resins or thermoplastic synthetic resins containing a reinforcement base material.

Figure 20:
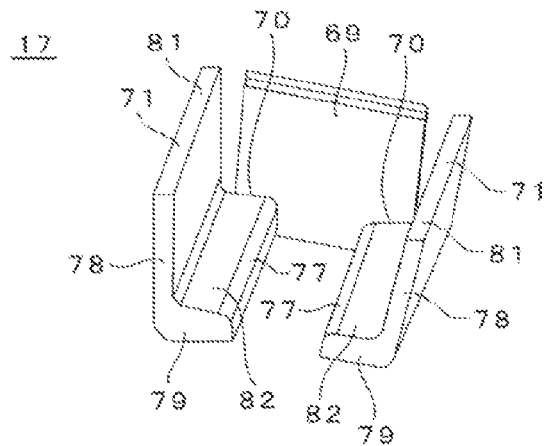
FIG. 20 is a perspective view of a lip seal of the rotational damper according to the present invention.
Figure 21:
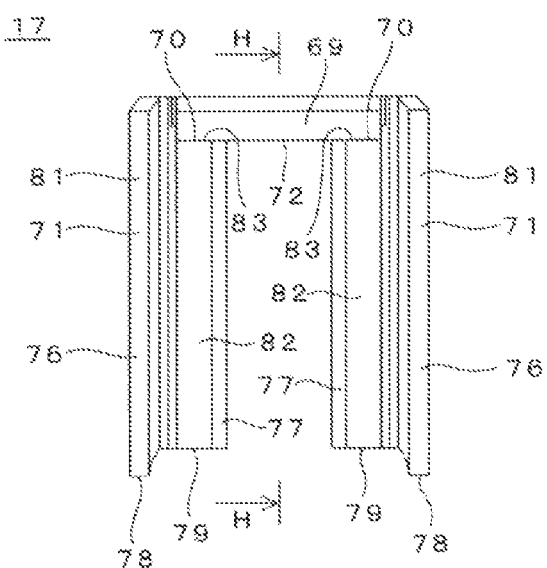
FIG. 21 is a plan view of the lip seal shown in FIG. 20.
Figure 22:
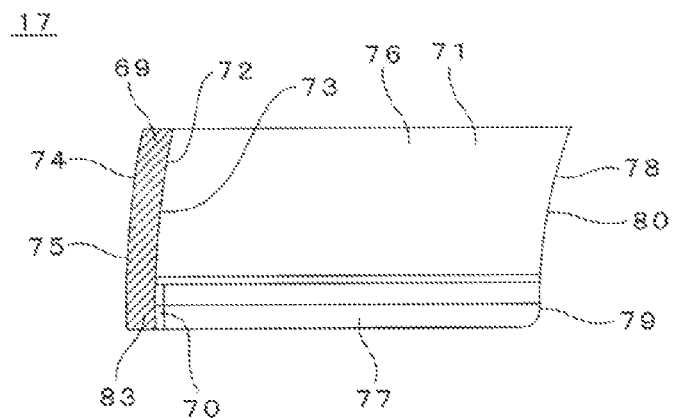
FIG. 22 is a cross-sectional view taken along the line H-H of FIG. 21.

A lip seal 17 mounted to the pair of rotary vanes 13, 14 is, as shown in FIGS. 20 to 22, composed of a substantially rectangularly shaped first seal piece 69 and a pair of second seal pieces that are connected with both corners 70, 70 at a lower end of the first seal piece 69.

An inner surface 72 of the first seal piece 69 is formed in such a manner as to be an arcuate recessed face 73 whose curvature is the same as those of the end face 61a of the rotary vane 13a and the end face 67a of the rotary vane 14a, and the outer face 74 of the first seal piece 69 is formed so as to be an arcuate projecting face 75 whose curvature is the same as the cylindrical inner peripheral face 35 to slidably contact with the cylindrical inner peripheral face 35 of the cylindrical standing wall portion 21 of the casing 12.

A second seal piece 71 is composed of a substantially rectangular plate-like portion 76; a standing wall portion 77 integrally formed with an end of the plate-like portion 76 on the side of a long side in a longitudinal direction, and an arcuate recessed face 80 formed over an end face 78 on the side of a short side of the plate-like portion 76 and an end face 79 of the standing wall portion 77 that continues the end face 78. And, an end portion 81 of the other long side of the plate-like portion 76 opens outward against a locking planar portion 82 of the standing wall portion 77. The plate-like portions 76 of the second seal pieces 71, 71 oppose with each other, and end portions 83, 83 of the second seal pieces 71, 71 are connected with both corner portions 70, 70 at the lower end of the first seal piece 69.

The arcuate recessed face 80, which is formed over an end face 78 on the side of a short side of the plate-like portion 76 and an end face 79 of the standing wall portion 77 continuing the end face 78, is formed to have the same curvature as that of the outer circumferential face 55 of the band-like cylindrically projecting portion 54 of the rotation body 15.

The standing wall portions 77, 77 of the second seal pieces 71, 71 of the lip seals 17 are engaged with the locking longitudinal grooves 59, 60 formed on the upper surface 56 and the lower surface 57 of one rotary vane 13 of the pair of rotary vanes 13, 14 and locking longitudinal grooves 65, 66 formed on the upper surface 63 and the lower surface 64 of the other rotary vane 14 of the pair of rotary vanes 13, 14 respectively, and arcuate recessed faces 80, 80 formed over the end face 78 on the side of a short side of the plate-like portion 76 and the end face 79 of the standing wall portion 77 continuing the end face 78 are engaged with the outer circumferential face 55 of the band-like cylindrically projecting portion 54 of the rotation body 15, and the arcuate recessed faces 73 on the inner surface 72 of the first seal piece 69 is engaged with the arcuate projecting face 62a on the end face 61a of the rotary vane 13a and the arcuate projecting face 68a on the end face 67a of the rotary vane 14a to be attached to the rotary vanes 13a, 14a, and the arcuate projecting faces 75 of the outer face 74 of the first seal piece 69 and the arcuate projecting face 62 on the end face 61 of the rotary vane 13b, and the arcuate projecting faces 75 and the arcuate projecting face 68 of the end face 67, which is formed on the end face 61 of the rotary vane 14b, are formed to be continuous arcuate projecting faces, and these continuous arcuate projecting faces slidably contact with the cylindrical inner peripheral face 35 of the cylindrical standing wall portion 21 of the casing 12.

In the lip seals 17 mounted to the rotary vanes 13a, 14a, the end portions 81, 81 on the side of a long side, which expands outside of the pair of plate-like portions 76, 76 of the second seal pieces 71, 71, are mounted so as to project in a width direction in comparison to widths w (refer to FIG. 5) of the upper surface 56a and the lower surface 57a of the rotary vane 13a and widths w of the upper surface 63a and the lower surface 64a of the rotary vane 14a, and the end portions 81, 81 on the side of a long side expand outside of the plate-like portions 76, 76 cross the tiered portion t between the upper end face 58a and the lower end face 58b of the band-like cylindrically projecting portion 54 of the rotation body 15.

The lip seals 17 attached to the rotary vanes 13a, 14a are constantly contact with the upper surface 26 of the annular bottom portion 20 of the casing 12 and a lower surface 89 of the lid body 16 at the end portions 81, 81 on the side of a long side expanding outside of the plate-like portions 76, 76.

For the casing 12 and the lid body 16, with which the lip seal 17 slidably contact, is usually used as-cast products through die-casting using aluminum, aluminum alloy, zinc or zinc alloy, or injection molded products using thermoplastic synthetic resin or thermoplastic synthetic resin containing a reinforcement base material. In the as-cast products or the injection molded products, it is difficult to obtain precise flatness due to shrinkage, sink and so on based on differences in wall thickness at the casting and molding, however, the wall thicknesses of the first seal piece 69 and the second seal pieces 71, 71 of the lip seal 17 are formed to be thin, and flexibility in deformation is given so as to closely slide along these slide faces with bad flatness, so that it is unnecessary to apply machining and so on to the upper surface 26 of the annular bottom portion 20 of the casing 12, which slidably contact with the lip seal 17, the lower surface 89 of the lid body 16, and the cylindrical inner peripheral face 35 of the cylindrical standing wall portion 21 of the casing 12.

The lip seal 17 is made, for example, by injection-molding method using polyolefin system resin such as polyester elastomer, polyurethane elastomer, polyethylene resin and polypropylene resin.

Figure 23:
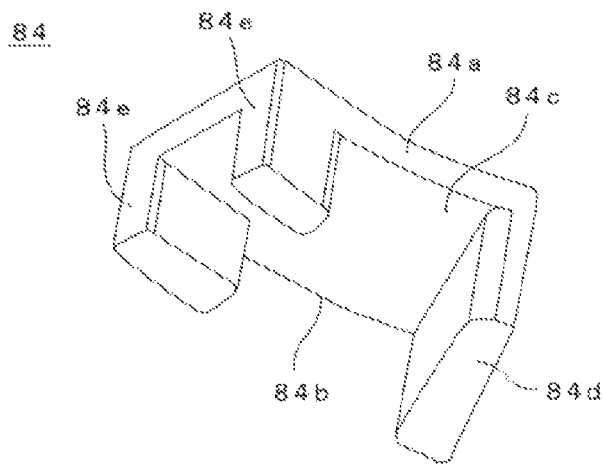
FIG. 23 is a perspective view of a check valve of the rotational damper according to the present invention.
Figure 24:
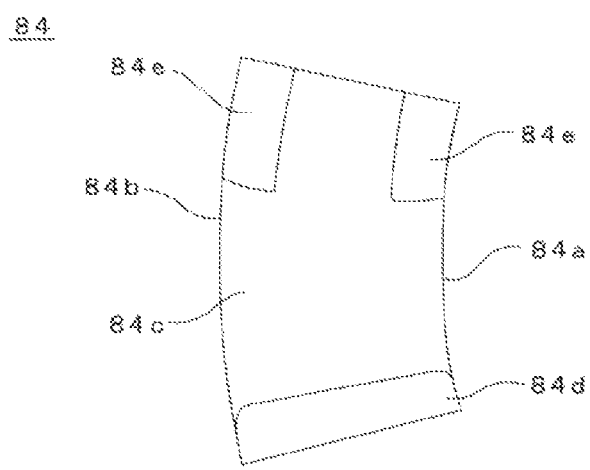
FIG. 24 is a plan view of the check valve shown in FIG. 23.
Figure 25:
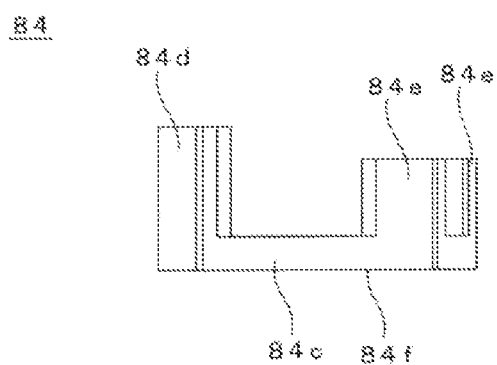
FIG. 25 is a front view of the check valve shown in FIG. 24.

As shown in FIGS. 23 to 25, a check valve 84 constituting a check valve mechanism 19 is provided with a strip-plate-like base portion 84c having an inner curved recessed portion 84a and an outer curved projecting face portion 84b that are curved with the same curvature center on both sides of a face in a longitudinal direction; a standing wall portion 84d formed so as to stand in a width direction on one end portion of one face of the base portion 84c; a pair of projecting portions 84e, 84e so as to stand in a width direction on the other end of the one face of the base portion 84c; and a flat face portion 84f formed on the other face in a longitudinal direction.

The check valve 84 is preferably made, for example, by injection-molding method and others using thermoplastic resin including polyolefin system resin such as polyacetal resin, polyamide resin, polyethylene resin and polypropylene resin.

The check valve 84 is mounted to the curved concave groove 39 of the partition portion 11 in such a manner that the inner curved recessed portion 84a of the base portion 84c is slidably contact with the inner curved convex wall face 40 of the curved concave groove 39 of the partition portions 11, 11 of the casing 12; the outer curved projecting face portion 84b is slidably contact with the outer curved concave wall face 41 of the curved concave groove 39 of the partition portions 11, 11 of the casing 12; the standing wall portion 84d contacts with end faces 47, 47 of a pair of locking projecting portions 46, 46 of the curved concave groove 39 of the partition portion 11 to cover the end faces 46, 46; and a flat surface 84f of the base portion 84c is flush with the upper surface 38 of the partition portion 11.

Disposing the check valve 84 in the curved concave groove 39 of the partition portion 11 allows the orifice groove 18 to be formed by the notched groove 49, which is formed on the upper surface 38 of the partition portion 11, and the inner curved recessed portion 84a of the check valve 84. This orifice groove 18 may be formed on the upper surface 38 outside of the partition portion 11.

The check valve 84 is movable in a circumferential direction along the inner curved convex wall face 40 and the outer curved concave wall face 41 of the curved concave groove 39 of the partition portion 11, and the check valve mechanism 19 is formed by the check valve 84 and the curved concave groove 39 of the partition portion 11.

Figure 27:
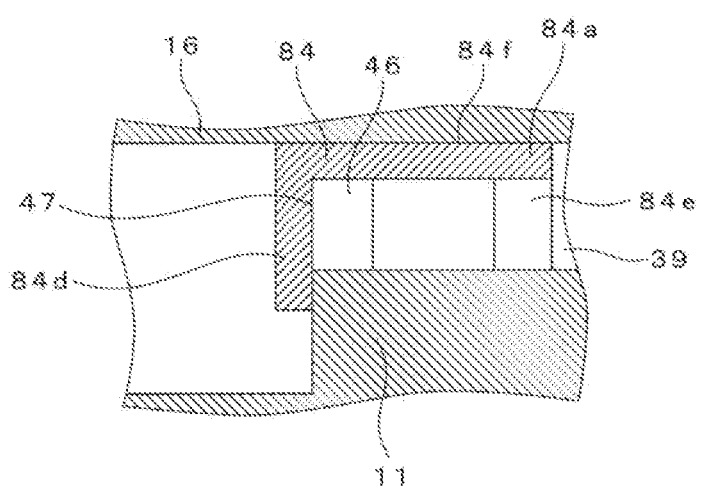
FIG. 27 is an explanatory drawing showing a condition that the check valve mechanism of the rotational damper according to the present invention is closed.

The check valve mechanism 19 with the above construction acts as described below. That is, when the rotation body 15, which is disposed in the cylindrical standing wall portion 21 of the casing 12, rapidly rotates in a direction of the arrow X shown in FIG. 4, a pair of rotary vanes integrally formed with the rotation body 15 also rotates. In accordance with the rapid rotational movement of the rotation body 15, the check valve 84, which forms the check valve mechanism 19 engaging with the curved concave groove 39 of the partition portion 11, receives fluid resistance of the viscous fluid L stored in the cylindrical standing wall portion 21 of the casing 12 and moves along the curved concave groove 39 at the standing wall portion 84d thereof, and the standing wall portion 84d of the check valve 84 contacts the end faces 47, 47 of a pair of locking projecting portions 46, 46 that narrow an opening at an end portion 43 that is formed on the end portion 43 of the curved concave groove 39, and close one opening of the curved concave groove 39 (refer to FIG. 27). At this moment, the lip seals 17 attached to the rotary vanes 13a, 14a receive fluid resistance of the viscous fluid L, and closely slidably contact with the end portion 81, on the side of a long side, expanding outside of the second seal piece 71, the upper surface 26 of the annular bottom portion 20 of the casing 12 and the lower surface 89 of the lid body 16, in addition, the arcuate projecting faces 75 of the first seal piece 69 of the lip seals 17 closely slidably contact with the cylindrical inner peripheral face 35 of the cylindrical standing wall portion 21 of the casing 12 to prevent the viscous fluid from flowing from the chamber R2 to the chamber R1.

By the check valve 84 is closed one opening of the curved concave groove 39, and by the lip seals 17 are prevented the flow of the viscous fluid L from the chamber R2 to the chamber R1, which causes the viscous fluid L to enter the chamber R1 through the orifice groove 18. When flowing though the orifice groove 18, the viscous fluid L provides large viscous resistance force against the rotational movement of the rotation body 15, which prevents rapid rational movement of the rotation body 15, so that the rotation body 15 slowly rotates and moves.

Figure 4:
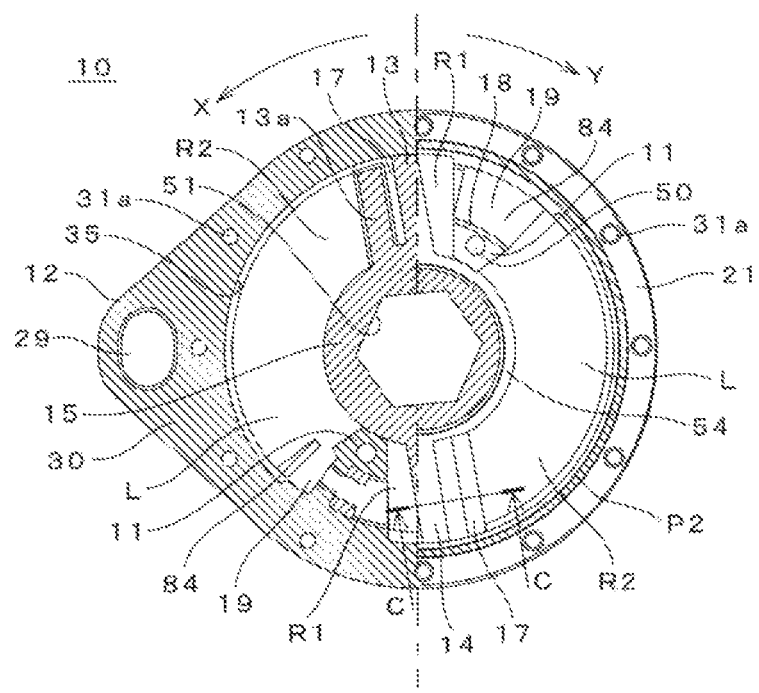
FIG. 4 is a cross-sectional view taken along the line B-B of FIG. 3.
Figure 5:
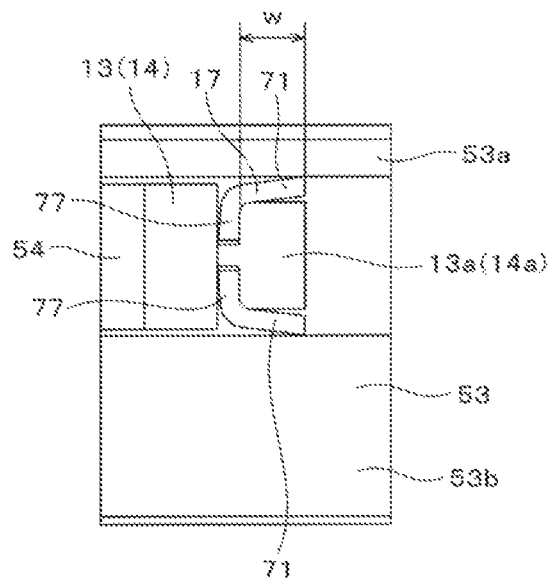
FIG. 5 is a cross-sectional view taken along the line C-C of FIG. 4.
Figure 6:
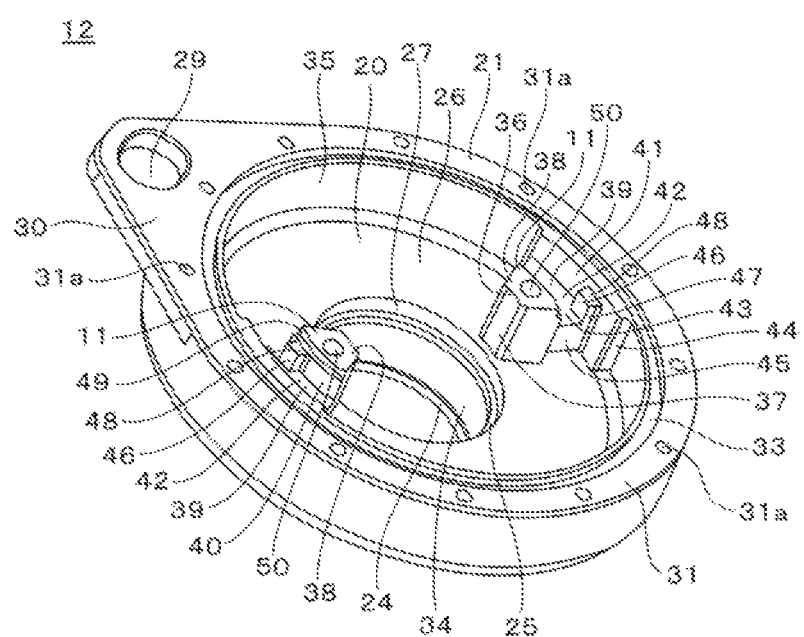
FIG. 6 is a perspective view of a casing of the rotational damper according to the present invention.
Figure 7:
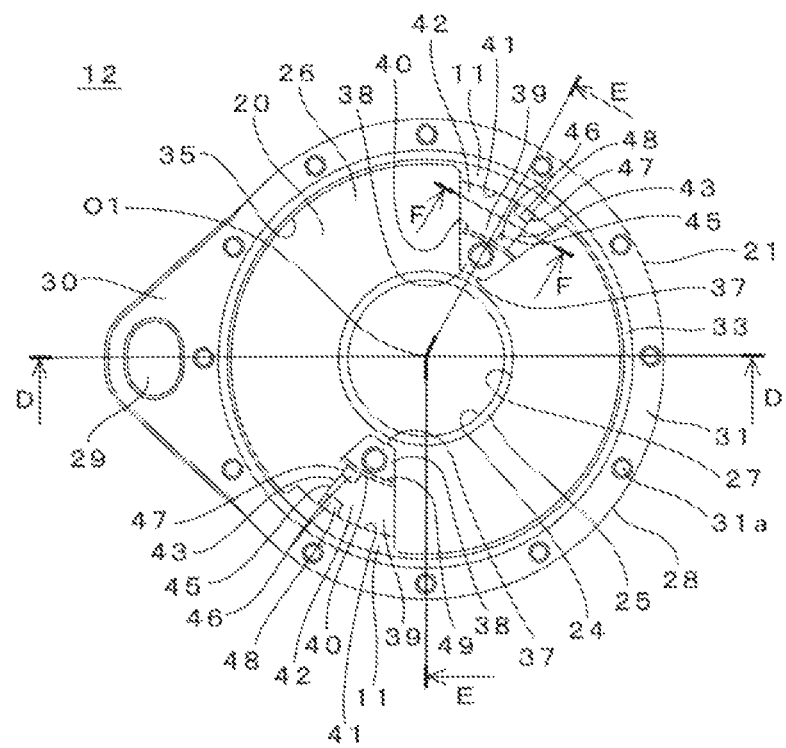
FIG. 7 is a plan view of the casing shown in FIG. 6.
Figure 8:
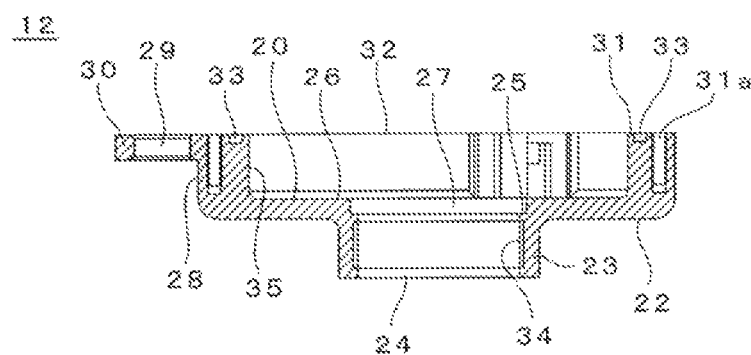
FIG. 8 is a cross-sectional view taken along the line D-D of FIG. 7.
Figure 9:
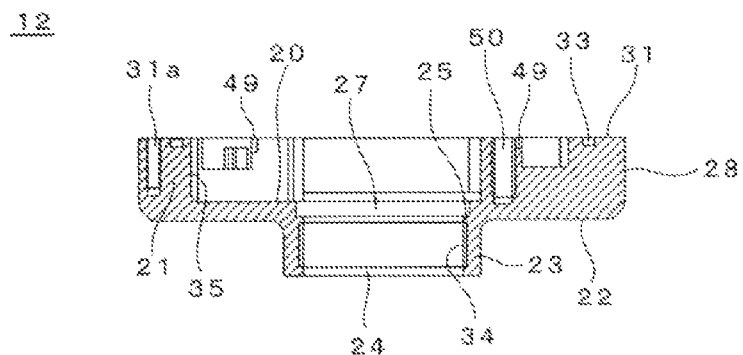
FIG. 9 is a cross-sectional view taken along the line E-E of FIG. 7.
Figure 10:
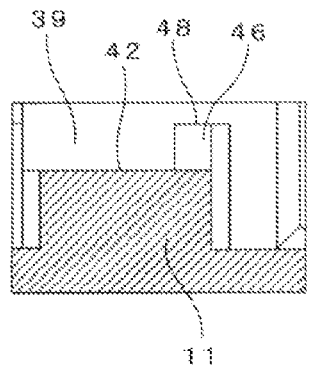
FIG. 10 is a cross-sectional view taken along the line F-F of FIG. 7.
Figure 11:
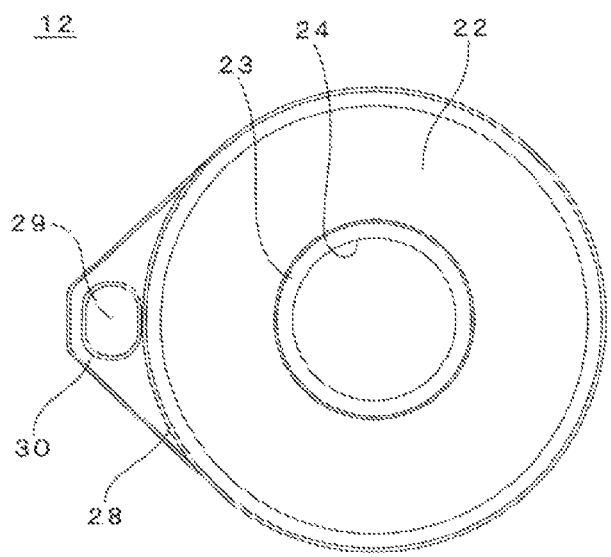
FIG. 11 is a bottom view of the casing shown in FIG. 6.
Figure 14:
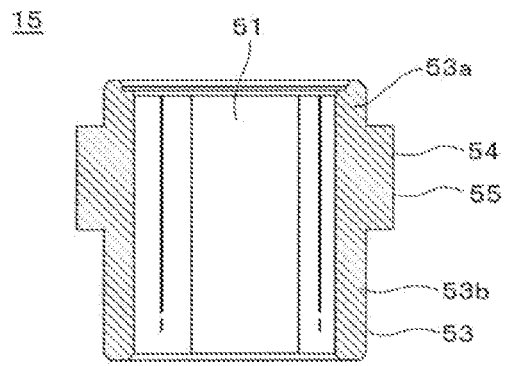
FIG. 14 is cross-sectional view taken along the line G-G of FIG. 13.
Figure 15:
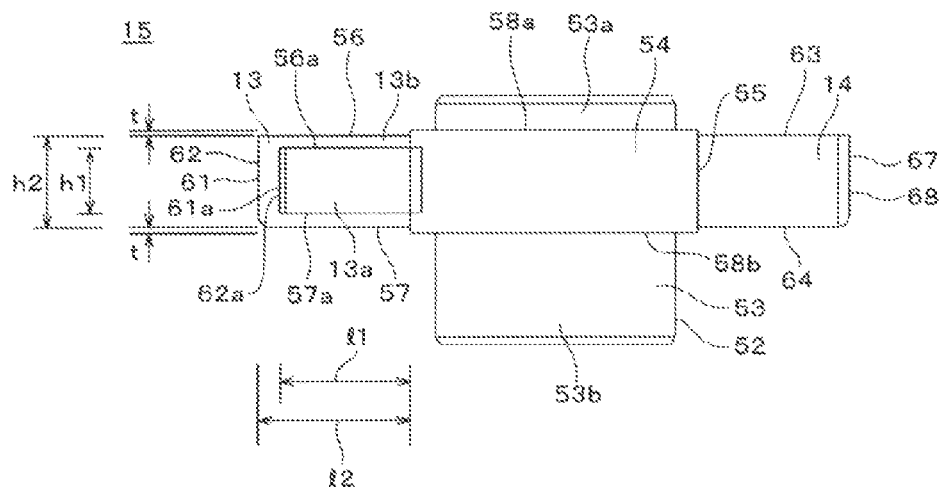
FIG. 15 is a front view of the rotation body shown in FIG. 12.
Figure 17:
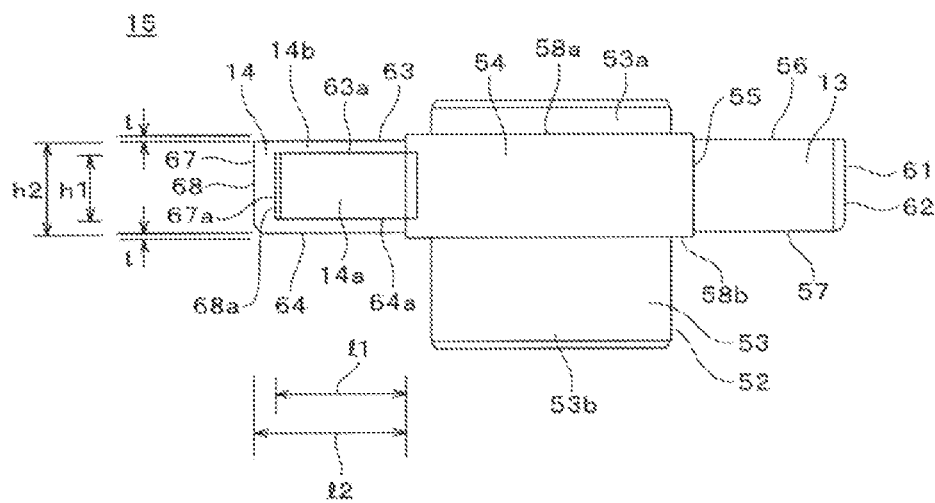
FIG. 17 is a back view of the rotation body shown in FIG. 15.
Figure 16:
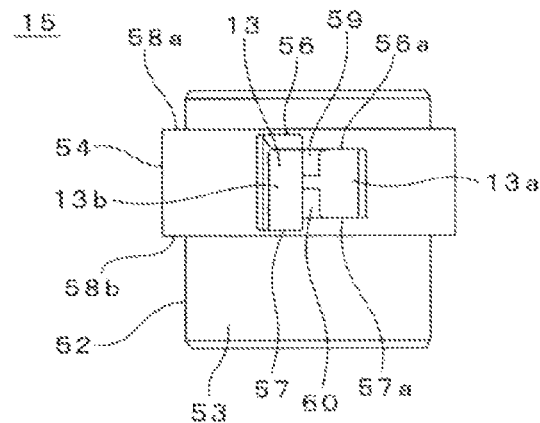
FIG. 16 is a left side view of the rotation body shown in FIG. 15.
Figure 18:
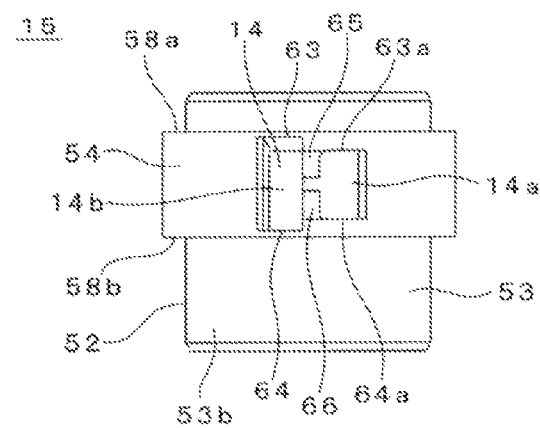
FIG. 18 is a right side view of the rotation body shown in FIG. 17.
Figure 19:
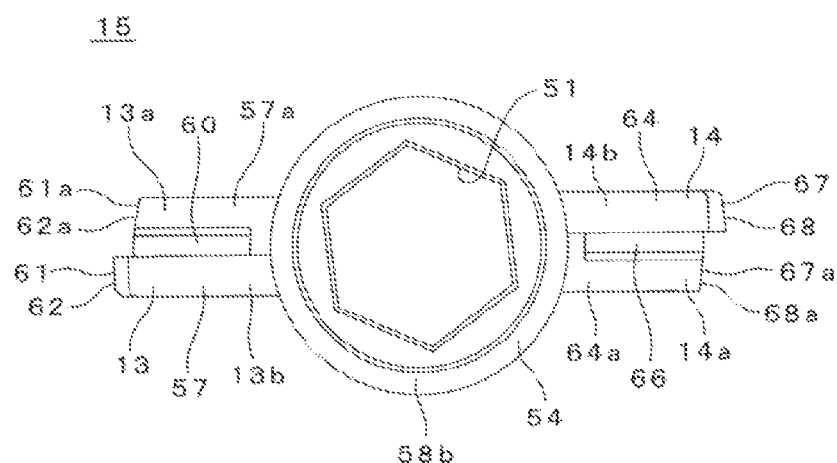
FIG. 19 is a bottom view of the rotation body shown in FIG. 12.

On the other hand, when the rotation body 15 rapidly rotates in a direction of the arrow Y shown in FIG. 4, the check valve 84 constituting the check valve mechanism 19 receives the fluid resistance of the viscous fluid L and moves along the curved concave groove 39 of the partition portion 11, which allows the contacts between the standing wall portion 84d of the check valve 84 and the end faces 47, 47 of the pair of locking projecting portions 46, 46 of the curved concave groove 39 to be released. At this moment, in the lip seals 17 attached to the rotary vanes 13a, 14a, close slidable contacts of the end portion 81 on the side of a long side, which receives the fluid resistance of the viscous fluid L and expands outside of the second seal piece 71, with the upper surface 26 of the annular bottom portion 20 of the casing 12 and the lower surface 89 of the lid body 16 are released, in addition, close slidable contacts of the arcuate projecting faces 75 of the first seal piece 69 and the cylindrical inner peripheral face 35 of the cylindrical standing wall portion 21 of the casing 12 are released. As a result, the viscous fluid L is allowed to flow from the chamber R1 to the chamber R2 through the curved concave groove 39, so that the rotation body 15 rapidly rotates without receiving viscous resistance of the viscous fluid L.

Figure 28:
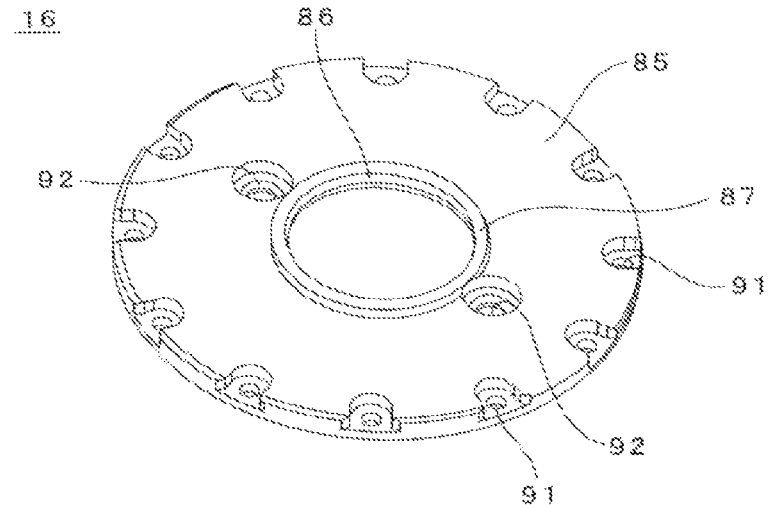
FIG. 28 is a perspective view of a lid body of the rotational damper according to the present invention.
Figure 29:
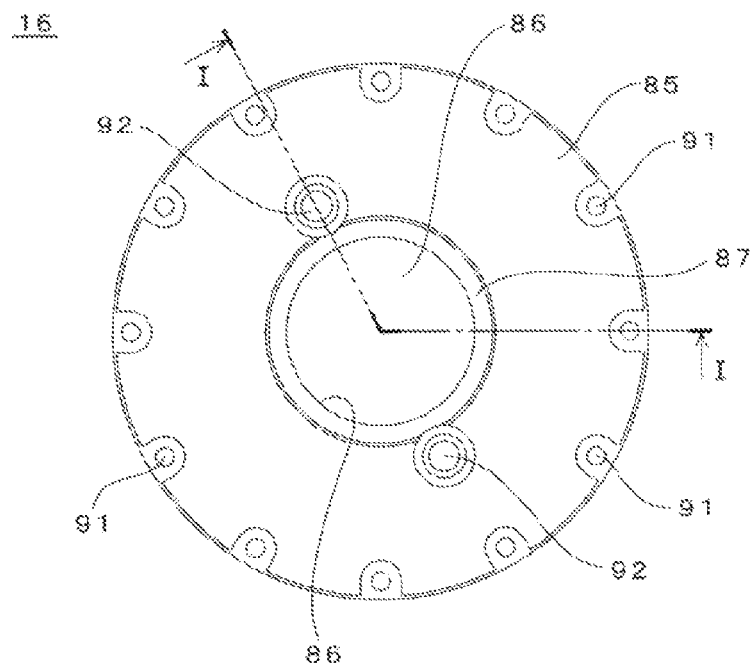
FIG. 29 is a plan view of the lid body shown in FIG. 28.
Figure 30:
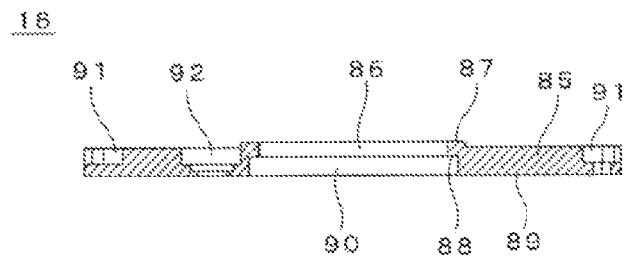
FIG. 30 is a cross-sectional view taken along the line I-I of FIG. 29.

The lid body 16 that closes the opening 32 of the cylindrical standing wall portion 21 of the casing 12 is, as shown in FIGS. 28 to 30, provided with a disk-like base plate 85; a cylindrically projecting portion 87 having a through hole 86 on an inner surface thereof and projecting at a central portion of the disk-like base plate 85; an engaging hole 90 having a larger diameter than that of the through hole 86 through an annular shoulder portion 88 and an opening on the lower surface 89, and on an outer periphery of the base plate 85 are formed a plurality of holes 91, 91 in a circumferential direction, and a pair of mounting holes 92, 92 are formed on the base plate 85 at positions where the mounting holes 92, 92 oppose with each other with the cylindrically projecting portion 87 of the base plate 85 between them.

The lid body 16 covers, as shown in FIG. 3, the opening 32 of the cylindrical standing wall portion 21 of the casing 12; the lower surface 87 thereof closely contacts with an O-ring P2 made of rubber resilient material that is inserted and fitted to the annular recessed groove 33 on the end face 31 of the cylindrical standing wall portion 21; the cylindrical base body portion 53a of the rotation body 15 is inserted into the through hole 86 of the cylindrical base body portion 53a; the annular shoulder portion 88 thereof closely contacts with an O-ring P3 made of rubber resilient material that is inserted and fitted to the upper end face 58a of the band-like cylindrically projecting portion 54 of the rotation body 15; the plurality of holes 91, 91 on an outer periphery are caused to coincide with screw holes 31a, 31a on the end face 31 of the cylindrical standing wall portion 21 of the casing 12 to screw screws 93, 93 with the screw holes 31a, 31a; a pair of mounting holes 92, 92 are caused to coincided with the screw holes 50, 50 of the partition portions 11, 11 of the casing 12; and screws 94, 94 are screwed with the screw holes 50 though an O-ring P4 made of rubber resilient material between a flange portion 94a of the screw 94 and the screw hole 50, which causes the lid body 16 to close the opening 32 of the cylindrical standing wall portion 21 of the casing 12 and to be fixed to the cylindrical standing wall portion 21.

The lid body 16 with the above construction is preferably made by die-casting method using aluminum, aluminum alloy, zinc or zinc alloy in the same manner as the casing 12, in addition, when thermoplastic synthetic resins such as polyacetal resins or thermoplastic resins containing a reinforcement base material are used, the lid body 16 is preferably made by injection molding. As the viscous fluid L stored in the inner face of the cylindrical standing wall portion 21 of the casing 12 is suitable a silicone oil of 100 to 1000 centistokes (cSt), but the viscous fluid L is not limited to this oil.

In the rotational damper 10 with the above construction, when the rotation body 15 shown in FIG. 4 rapidly rotates in a direction of the arrow X, a pair of rotary vanes 13, 14 integrally formed with the rotation body 15 also rotates. In accordance with the rapid rotational movements of the rotation body 15 and the pair of rotary vanes 13, 14, the check valves 84, 84, which form the check valve mechanisms 19, 19 engaging with the curved concave grooves 39, 39 of the partition portions 11, 11, receive fluid resistance of the viscous fluid L stored in the cylindrical standing wall portion 21 of the casing 12 and move along the curved concave grooves 39, 39 at the standing wall portions 84d, 84d thereof, and the standing wall portions 84d, 84d of the check valves 84, 84 contact the end faces 47, 47 of a pair of locking projecting portions 46, 46, which are formed on the end portions 43, 43 of the curved concave grooves 39, 39, and narrow the openings at the end portions 43, 43 of the curved concave grooves 39, 39, and close one opening of the curved concave grooves 39, 39 (refer to FIG. 27). At this moment, in the lip seals 17 attached to the rotary vanes 13a, 14a, the end portions 81, on the side of a long side, expanding outside of the second seal pieces 71 subject to fluid resistance of the viscous fluid L closely slidably contacts with the upper surface 26 of the annular bottom portion 20 of the casing 12 and the lower surface 89 of the lid body 16, in addition, the arcuate projecting faces 75 of the first seal piece 69 closely slidably contacts with the cylindrical inner peripheral face 35 of the cylindrical standing wall portion 21 of the casing 12 to prevent the viscous fluid L from flowing from the chamber R2 to the chamber R1, which are divided by the rotary vanes 13, 14, between the partition portions 11, 11 in the cylindrical standing wall portion 21 of the casing 12.

By the check valves 84, 84 is closed one opening of the curved concave grooves 39, 39, and close slidable contacts of the end portions 81, 81, on the side of a long side, expanding outside of the second seal pieces 71, 71 of the lip seals 17 with the upper surface 26 of the annular bottom portion 20 of the casing 12 and the lower surface 89 of the lid body 16, in addition, close slidable contacts of the arcuate projecting faces 75, 75 of the first seal pieces 69, 69 with the cylindrical inner peripheral face 35 of the cylindrical standing wall portion 21 of the casing 12 prevent the viscous fluid L from flowing from the chamber R2 to the chamber R1, and the viscous fluid L in the chamber R2 flows into the chamber R1 through the orifice grooves 18, 18. When the viscous fluid L flows through the orifice grooves 18, 18, the viscous fluid L provides large viscous resistance force against the rotational movement of the rotation body 15, which prevents rapid rational movement of the rotation body 15, so that the rotation body 15 slowly rotates and moves.

On the other hand, when the rotation body 15 rotates and moves in a direction of the arrow Y shown in FIG. 4, the check valves 84, 84, which form the check valve mechanisms 19, 19, move along the curved concave grooves 39, 39 of the partition portions 11, 11 while receiving the fluid resistance, and contacts between the standing wall portions 84d, 84d of the check valves 84, 84, and the end faces 47, 47 of the pair of locking projecting portions 46, 46 of the curved concave groove 39 are released. At this moment, in the lip seals 17 attached to the rotary vanes 13a, 14a, close slidable contacts of the end portions 81 on the side of a long side, which receives the fluid resistance of the viscous fluid L and expands outside of the second seal pieces 71, with the upper surface 26 of the annular bottom portion 20 of the casing 12 and the lower surface 89 of the lid body 16 are released, in addition, close slidable contacts of the arcuate projecting faces 75 of the first seal piece 69 and the cylindrical inner peripheral face 35 of the cylindrical standing wall portion 21 of the casing 12 are released. As a result, the viscous fluid L is allowed to flow from the chamber R1 to the chamber R2 through the curved concave grooves 39, 39, so that the rotation body 15 rapidly rotates and moves without receiving viscous resistance of the viscous fluid L.

With the above rotational damper 10, the check valve mechanisms 19, 19 for preventing flow of the viscous fluid L from the chamber R2 to the chamber R1 act at the rapid rotational movement of the rotation body 15 only in one direction, which brakes rapid rotational movement of the rotation body 15 and allows the rotational movement of the rotation body 15 to be slow, providing a rotational damper with remarkably excellent response.

Figure 31:
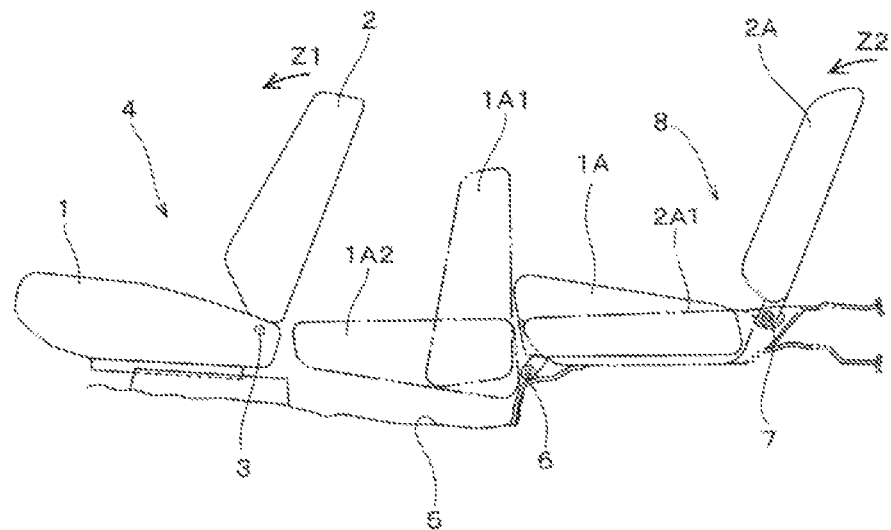
FIG. 31 is an explanatory drawing showing an example of a vehicle seat.
Figure 32:
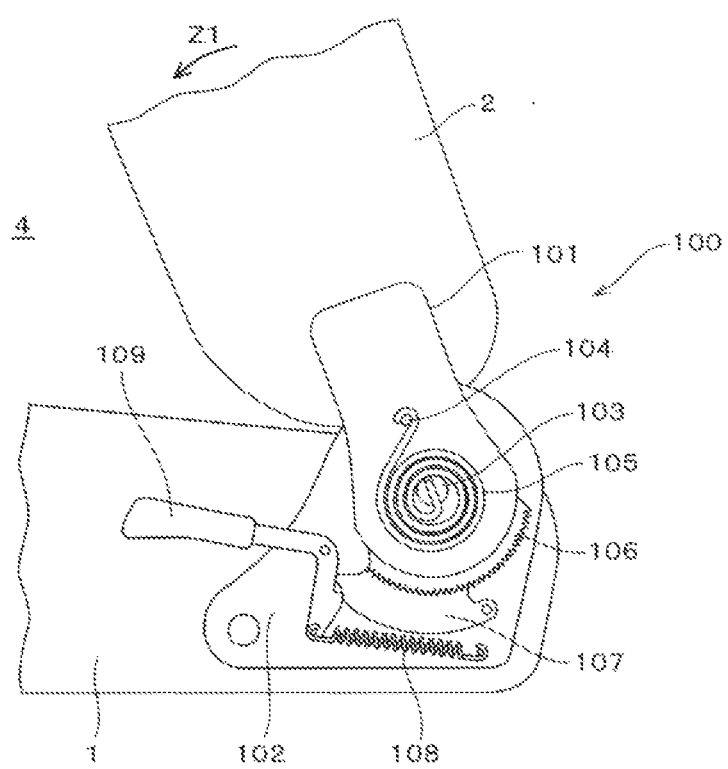
FIG. 32 is a schematic view showing a reclining device of a vehicle seat.
Figure 33:
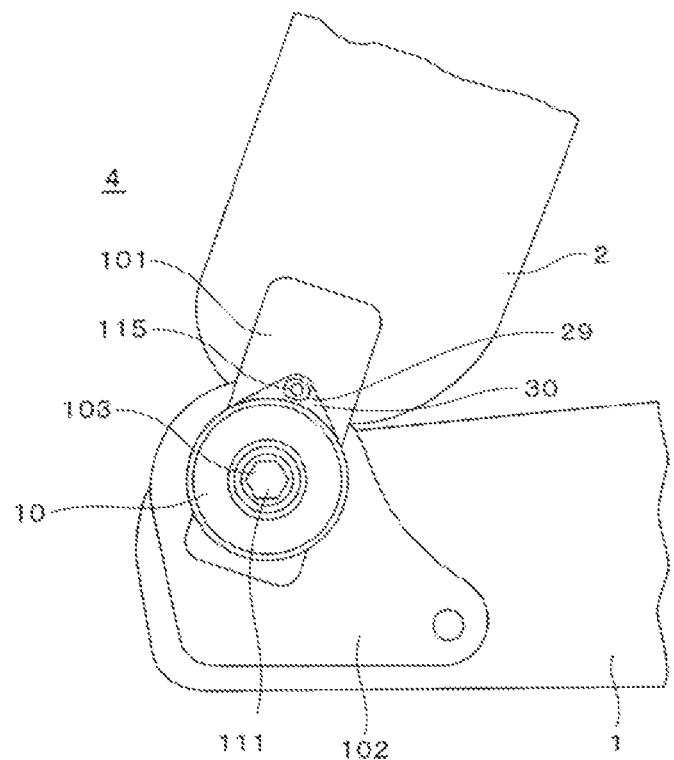
FIG. 33 is a schematic view showing a condition that the rotational damper of the vehicle seat with the rotational damper according to the present invention is mounted.

The above-mentioned rotational damper 10 with the construction for braking rapid rotational movement of the rotation body 15 only in one direction about the center O2 against the casing 12 can be used, for example, for a vehicle seat shown in FIG. 31. More specifically, in a vehicle seat 100 according to the first example, a reclining device 101 (refer to FIG. 32) is mounted to one side of the connecting portion of the front seat 4 and the rotational damper 10 (refer to FIG. 33) is mounted to the other side of the front seat 4, in which the seat cushion 1 and the seat back are connected by the hinge mechanism 3, and the seat back 2 can be inclined at an angle in a back and forth direction and the seat back 2 can be fixed at a desired angle.

The reclining device 100 is composed of: a reclining device 101 fixed to the seat back 2; a fixed hinge bracket 102 fixed to the seat cushion 1; a rotary pivot 103 of the hinge mechanism 3 for connecting the reclining device 101 and the fixed hinge bracket 102; a spiral spring 105 whose one end portion is engaged with a fixed pin 104 that is fixed to the reclining device 101 and one end portion is engaged with and fixed to the fixed pin 104, which is fixed to the reclining device 101, and the other end portion is fixed to the rotary pivot 103 to urge forward inclination of the seat back 2 (in a direction shown by the arrow Z1 in FIGS. 31 and 32); a gear 106 formed at a lower end portion of the reclining device 101; a ratchet gear 107 engaging with the gear 106 and fixed to the fixed hinge bracket 102; and an operation lever 109 connected with a portion near the ratchet gear 107 through a coil spring 108. Then, in this construction, releasing a lock caused by the engagement between the gear 106 and the ratchet gear 107 by lifting the operation lever 109 allows the seat back 2 to incline rearward, in addition, urging force of the spiral spring 105, which is mounted to urge the seat back 2 forward, causes the seat back 2 to incline from rearward to forward, and releasing the lifted operation lever 109 sets to a locked state again.

The rotational damper 10 mounted on the other side of the both sides of the portion for connecting the seat cushion 1 and the seat back 2 allows the through hole 29 of the mounting ear portion 30 of the casing 12 composing this rotational damper 10 to engage with a fixed pin 115, which is fixed to the reclining device 101, is fixed to the seat back 2, and to a hexagonal shaft 111 of the rotary pivot 103 of the hinge mechanism 3, which connects the reclining device 101 and the fixed hinge bracket 102 with each other, is engaged with and fixed to the rotation body 15, which forms this rotational damper 10 on the hexagonal shaft 111 of the rotary pivot 103 of the hinge mechanism 3, which allows the rotational damper 10 to be mounted to a portion connecting the seat cushion 1 and the seat back 2 with each other on the other side in a width direction.

With the front seat 4 having the rotational damper 10 according to the present invention described above, the seat back 2 supported by the rotary pivot 103 and the reclining device 100 is allowed inclination in a back and forth direction of the seat back 2 by releasing the lock through the operation lever 109 of the reclining device 100, and a locked state is secured again by releasing the operation lever 109 at a desired angle. Then, to the seat back 2 that is supported though locking at standing position, releasing the lock through the operation lever 109 allows the seat back 2 to rapidly incline forward due to urging force of the spiral spring 105 (in a direction shown by the arrow Z1 in FIGS. 31 and 32). At this moment, the rotational damper 10, which is engaged with the fixed pin 115 that is fixed to the reclining device 101 of the seat back 2 in the mounting ear portion 30 of the casing 12, and is inserted and fixed to the hexagonal shaft 111 of the rotary pivot 103 for connecting the reclining device 101 and the fixed hinge bracket 102 in the angle hole 51 disposed in the cylindrical standing wall portion 21 of the casing 12, acts.

More specifically, through an ellipse-shaped through hole 2 of the mounting ear portion 30 passes the fixed pin 115, which is fixed to the reclining device 101 of the seat back 2, and the fixed pin 115 moves in the ellipse-shaped through hole 2, at the same time the seat back 2 inclines forward due to urging force of the spiral spring 105, which causes the fixed pin 115 to contact an inner wall of the through hole 2, and the rotation body 15, which composes the rotational damper 10 that is inserted and fixed to the hexagonal shaft 111 of the rotary pivot 103, rotates. This rotational movement of the rotation body 15 allows a pair of rotary vanes 13, 14, which are integrally formed with the rotation body 15, to rotate also. In accordance with the rotational movement of the pair of rotary vanes 13, 14, the check valve 84, 84, which form the check valve mechanisms 19, 19 engaging with the curved concave grooves 39, 39 of the partition portions 11, 11, receive fluid resistance of the viscous fluid L, which stored in the cylindrical standing wall portion 21 of the casing 12, on the standing wall portion 84d thereof, and move along the curved concave grooves 39, 39, and the standing wall portion 84d of the check valve 84 contacts with a pair of locking projecting portions 46, 46, which narrow openings of the curved concave grooves 39, 39 formed on the end portion 43 of the curved concave grooves 39, 39, and close one opening of the curved concave grooves 39, 39.

At this moment, the lip seal 17 attached to the rotary vanes 13a, 14a receives the fluid resistance of the viscous fluid L, and closely slidably contacts with the end portion 81 on the side of a long side expanding outside of the second seal piece 71, the upper surface 26 of the annular bottom portion 20 of the casing 12 and the lower surface 89 of the lid body 16, in addition, and closely slidably contacts with the arcuate projecting face 75 of the first seal piece 69 and the cylindrical inner peripheral face 35 of the cylindrical standing wall portion 21 of the casing 12, which prevents flow of the viscous fluid L from the chamber R2 to the chamber R1, which are divided by the rotary vanes 13, 14, between the partition portions 11, 11 in the cylindrical standing wall portion 21 of the casing 12.

Closing one of the openings of the curved concave grooves 39, 39 prevents the flow of the viscous fluid L from the chamber R2 to the chamber R1, so that the viscous fluid L will flow into the chamber R1 through the orifice groove 18. When flowing through the orifice groove 18, against rotational movement of the rotation body 15 acts large viscous resistance force of the viscous fluid L, which prevents rapid rotational movement of the rotation body 15, allowing the seat back 2, which is supported by the rotary pivot 103, with which and to which the rotation body 15 is engaged and fixed, to slowly incline forward.

Figure 26:
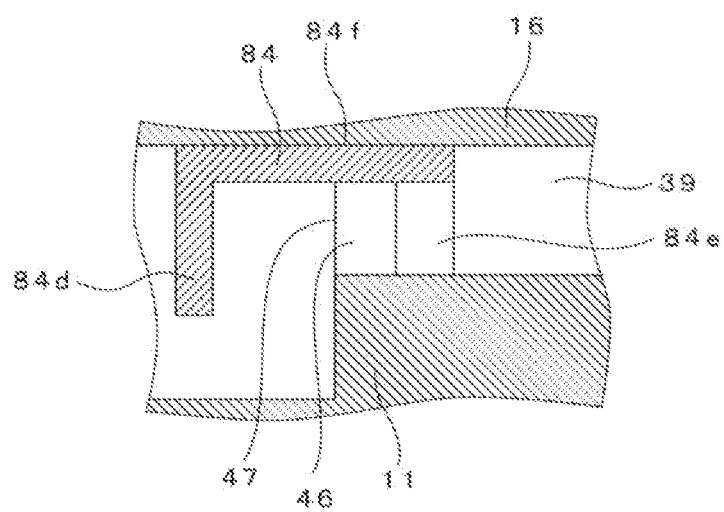
FIG. 26 is an explanatory drawing showing a condition that the check valve mechanism of the rotational damper according to the present invention is released.

On the contrary, when the seat back 2 is risen from a position inclined forward to a standing position, in accordance with the rotational movement of the rotation body 15, a pair of rotary vanes 13, 14 rotatably move also. With the rotational movement of the pair of rotary vanes 13, 14, the check valve 84 composing the check valve mechanism 19 receives fluid resistance of the viscous fluid L on the standing wall portion 84d and moves along the curved concave grooves 39, 39 of the partition portions 11, 11, and then projecting portions 84e, 84e of the check valve 84 contact with the locking projection 46, 46 of the curved concave grooves 39, 39 to stop the movement of the check valve 84. When the movement of the check valve 84 stops, engagements between the standing wall portion 84d of the check valve 84 and end faces 47, 47 of a pair of locking projecting portions 46, 46 of the curved concave groove 39 are released (refer to FIG. 26), and the viscous fluid L is allowed to flow from the chamber R1 to the chamber R2 via the curved concave groove 39.

The lip seal 17 mounted to the rotary vanes 13a, 14a receives fluid resistance of the viscous fluid L, and close slidable contacts of the end portion 81 on the side of a long side expand outside of the second seal piece 71 with the upper surface 26 of the annular bottom portion 20 of the casing 12 and the lower surface 89 of the lid body 16 are released, in addition, close slidable contact between the arcuate projecting faces 75 of the first seal piece 69 and the cylindrical inner peripheral face 35 of the cylindrical standing wall portion 21 of the casing 12 is released, which allows the viscous fluid L to flow from the chamber R1 to the chamber R2 between the partition portions 11, 11 in the cylindrical standing wall portion 21 of the casing 12 that are divided by the rotary vanes 13, 14. As a result, the rotation body 15 rapidly rotates without receiving viscous resistance of the viscous fluid L, which swiftly performs return of the seat back 2, which is supported by the rotary pivot 103 with which and to which the rotation body 15 is engaged and fixed, to a standing position.

A vehicle seat in the second example is a rear seat 8, and the rotational damper 10 is mounted to the hinge mechanism 7 of the seat back 2A in a double fall-down seat, on the rear seat 8 side, in which a seat cushion 1A shown in FIG. 31 is connected to a hinge mechanism 6 fixed to the vehicle body floor 5 at a forward lower portion thereof; the seat cushion 1A is risen substantially 90 degree as indicated by the chain line 1A1 with the hinge mechanism 6 as a supporting point; further the seat cushion 1A is inverted 180 degree upside down as indicated by the chain line 1A2; the seat back 2A that is connected to the hinge mechanism 7 fixed to the vehicle body floor 5, is risen substantially 90 degree, or folding the seat back 2A forward, as indicated by the chain line 2A1, into a space position of the seat cushion 1A that is inverted substantially 180 degree upside down to widen a luggage's space.

Figure 34:
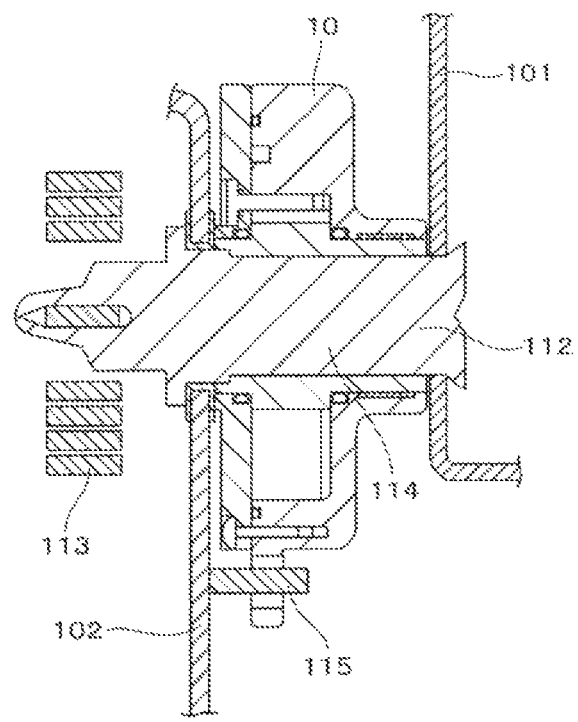
FIG. 34 is a schematic view showing a condition that the rotational damper of the vehicle seat with the rotational damper according to the present invention is mounted.

The rear seat 8 as a vehicle seat is, as shown in FIG. 34a, composed of a reclining device 101 fixed to the seat back 2A; a fixed hinge bracket 102 fixed to the vehicle body floor 5; a rotary pivot 112 of the hinge mechanism 7 for connecting the reclining device 101 and the fixed hinge bracket 102; a spiral spring 113 whose one end portion is swaged to the rotary pivot 112 and the other end portions is fixed to the fixed hinge bracket 102 to urge forward inclination of the seat back 2A (in a direction shown by the arrow Z2 in FIG. 31); and the rotational damper 10 mounted by fitting and fixing the angle hole 51 of the rotation body 15 to a hexagonal shaft 114 of the rotary pivot 112 and inserting the ellipse-shaped through hole 2 of the casing 12 to the fixed pin 115 standing on the fixed hinge bracket 102.

In this rear seat 8 also, in the same manner as the front seat 4, to the seat back 2A that is held through locking at standing position, releasing the lock allows the seat back 2A to rapidly incline forward due to urging force of the coil spring 113 (in a direction shown by the arrow Z2 in FIG. 31). At this moment, the rotational damper 10, whose ellipse-shaped through hole 29 of the mounting ear portion 30 of the casing 12 is inserted into the fixed pin 115 fixed to the fixed hinge bracket 102 that is fixed to the vehicle body floor 5, and whose angle hole 51 of the rotation body 15 is fitted and fixed to the hexagonal shaft 114 of the rotary pivot 112 that is fixed to the reclining device 101, acts.

The ellipse-shaped through hole 29 of the mounting ear portion 30 is inserted into the fixed pin 115 fixed to the fixed hinge bracket 102 that is fixed to the vehicle body floor 5, and the seat back 2A inclines forward due to urging force of the spiral spring 113, at the same time the fixed pin 115 moves in the ellipse-shaped through hole 29 and contacts with an inner wall of the through hole 29, which causes the rotation body 15 fitted and fixed to the hexagonal shaft 114 of the rotary pivot 112 to rotatably move. Due to this rotational movement of the rotation body 15, the rotational damper 10 acts in the same manner as that mounted to the front seat 4, rapid rotational movement of the rotation body 15 is prevented, which performs slow forward inclination of the seat back 2A supported by the rotary pivot 112 to which the rotation body 15 is fitted and fixed.

On the contrary, when the seat back 2A is risen from a position inclined forward to a standing position, in the same manner as the front seat 4, the seat back 2A swiftly returns to the standing position.

As described above, vehicle seats with the rotational damper 10 are excellent in response since against rapid tilting of the seat back 2 or 2A acts large viscous resistance of the viscous fluid L to avoid rapid rotation of the rotation body 15, so that slow forward tilting of the seat back 2 or 2A solves problems of large damage to infants such as hold their bodies between the seat cushion 1 or 1A and the seat back 2 or 2A, which may occur when locking is released as the infants seat thereon as they are and damage of articles laid on the seat cushion 1 or 1A.

DESCRIPTION OF THE REFERENCE NUMBERS 1, 1A seat cushions
2, 2A seat backs
10 rotational damper 11 partition portion
12 casing
13, 14 rotary vanes
15 rotation body
16 lid body
17 lip seal
18 orifice groove
19 check valve mechanism
20 cylindrical vertical wall portion
39 curved concave groove
84 check valve

The invention claimed is:

1. A rotational damper comprising;
a casing having a pair of partition portions opposing with each other therein;
a rotation body rotatably arranged in the casing and having a pair of rotary vanes that divide each chamber between the partition portions in the casing into two chambers in corporation with the casing;
a viscous fluid stored in the casing;
a lid body for closing an opening of the casing;
a lip seal mounted on each of the pair of rotary vanes such that the lip seal is moveable with the rotation body as the rotation body rotates relative to the casing, the lip seal being configured to be constantly brought into slide contact with the casing and the lid body;
an orifice groove formed on the partition portion, and allowing the viscous fluid to flow into each of the chambers between the partition portions therethrough; and
a check valve mechanism mounted on a respective one of the pair of partition portions and adapted to brake rapid rotational movement of the rotation body only in one direction of the rapid rotational movement of the rotation body.

2. The rotational damper as claimed in claim 1, wherein to each of said pair of rotary vanes is formed an elongate locking groove on upper and lower surfaces thereof along longitudinal direction so as to divide the rotary vane in two pieces;
a height from an upper surface to a lower surface of one of the divided rotary vanes is lower than a height from upper surface to a lower surface of another rotary vane, and longitudinal length of said one of the divided rotary vane is shorter than that of the other divided rotary vane, and the lip seal is engaged with and mounted to the elongate locking grooves so as to cover the upper and lower surfaces and an end face of the rotary vane and can be opened and closed in a vertical direction of the rotary vane.

3. The rotational damper as claimed in claim 1, wherein the lip seal comprise a first seal piece of generally square shape, and a pair of second seal pieces that are connected to both corner portions of a lower end of the first seal piece, wherein an inner surface of the first seal piece shapes an arcuate recessed face; an outer surface thereof shapes an arcuate projecting face;
each of the second seal pieces comprises a plate-like portion that is shaped like a rectangle, a standing wall portion integrally formed with an end portion on a side of one long side of said plate-like portion along a longitudinal direction thereof, and an arcuate recessed face formed between an end face of one short side of the plate-like portion and an end face that continues the end face on a side of the standing wall portion;
an end portion on a side of another long side of the plate-like portion expands toward outside of a locking planar portion of said standing wall portion;
and the plate-like portions of the second seal piece face each other and are connected to both corners of a lower end of the first seal piece at an end portion of the standing wall portion.

4. The rotational damper as claimed in claim 1, wherein said lip seal is mounted to the rotary vane such that:
standing wall portions of the second seal pieces are engaged with locking longitudinal grooves formed on upper and lower surfaces of the one rotary vane and locking longitudinal grooves formed on upper and lower surfaces of the other rotary vane of the pair of rotary vanes respectively;
arcuate recessed faces formed over an end face on the side of one short side of a plate-like portion and an end face of the standing wall portion continuing the end face are engaged with an outer circumferential face of a band-like cylindrically projecting portion of the rotation body;
and an arcuate recessed face on the inner surface of the first seal piece is engaged with an arcuate projecting face on the end face of the rotary vane and the arcuate projecting face on the end face of the rotary vane;
and an arcuate projecting face of the outer face of the first seal piece, an arcuate projecting face on the end face of the rotary vane, and the arcuate projecting face on an end face of the arcuate projecting face of the end face of the rotary vane are formed to be continuous arcuate projecting faces.

5. The rotational damper as claimed in claim 1, wherein said check valve mechanism comprises a curved concave groove formed on each of the pair of partition portions, and a check valve engaged with the curved concave groove so as to be movable along the curved concave groove.

6. The rotational damper as claimed in claim 5, wherein said curved concave groove includes an inner curved convex wall face, an outer curved concave wall face, and a bottom wall face;
one end portion of the curved concave groove is recessed in a circumferential direction more than one end portion of the partition portion;
and the curved concave groove has a standing wall face perpendicular to the inner curved convex wall face and the outer curved concave wall face and a pair of locking projecting portions for narrowing an opening of the curved concave groove at an end portion on the standing wall face side of the curved concave groove.

7. The rotational damper as claimed in claim 5, wherein said check valve comprises:
a band-plate-like base portion having an inner curved concave face portion and an outer curved convex face portion that are curved with a same curvature center on both sides of one face in a longitudinal direction thereof;
a standing wall portion standing on one end portion of one face of the base portion along a width direction; a pair of projecting portions standing on another end portion of the one face of the base portion so as to oppose with each other in a width direction;
and an even flat face portion formed on another face in a longitudinal direction.

8. The rotational damper as claimed in claim 1, wherein said check valve mechanism is constructed such that:
the inner curved concave face portion of the band-plate-like base portion of the check valve slidably contacts with the inner curved convex wall face of the curved concave groove of the partition portion;
the outer curved convex face portion slidably contacts with the outer curved concave wall face of the curved concave groove of the partition portion;

the standing wall portion covers and contacts with end faces of a pair of locking projecting portions of the curved concave groove of the partition portion;

and an even flat face portion is flush with an upper surface of the partition portion and is engaged with the curved concave groove of the partition portion.

9. The rotational damper claimed in claim 1 further in combination with a vehicle seat having the rotational damper mounted thereto, said vehicle seat including a reclining mechanism on one side of both ends of a connecting portion in a width direction, said connecting portion connecting a seat back and a seat cushion, said vehicle seat characterized in that:

on another side of the both ends of the connecting portion for connecting the seat back and the seat cushion in the width direction, to a fixed pin fixed to a movable hinge bracket that is fixed to the seat back is fitted an ellipse-shaped through hole of a mounting ear portion of the casing;

and to a square bar part of a rotary pivot connecting the movable hinge bracket and the fixed hinge bracket is fitted and fixed a square hole of the rotation body.

10. The rotational damper claimed in claim 1 further in combination with a vehicle seat having the rotational damper mounted thereto for use with a hinge mechanism of a seat cushion and a hinge mechanism of a seat back of a double fall-down seat, such that in said double fall-down seat:

the seat cushion is connected with a hinge mechanism fixed to a vehicle body floor at a forward lower portion thereof;

the seat cushion is risen substantially 90 degree; further the seat cushion is inverted substantially 180 degree upside down;

and a luggage's space can be widened by rising the seat back that is connected to the hinge mechanism fixed to the vehicle body floor substantially 90 degree, or folding the seat back forward into a space position of the seat cushion that is inverted substantially 180 degree upside down.

11. The rotational damper claimed in claim 1 further in combination with a vehicle seat having the rotational damper mounted thereto for use with a hinge mechanism of a seat back of a single fall-down seat in which a seat back connected with a hinge mechanism fixed to a vehicle body floor is folded to a forward portion on a seat cushion side.

12. The rotational damper as claimed in claim 2, wherein the lip seal comprise a first seal piece of generally square shape, and a pair of second seal pieces that are connected to both corner portions of a lower end of the first seal piece, wherein an inner surface of the first seal piece shapes an arcuate recessed face; an outer surface thereof shapes an arcuate projecting face;

each of the second seal pieces comprises a plate-like portion that is shaped like a rectangle, a standing wall portion integrally formed with an end portion on a side of one long side of said plate-like portion along a longitudinal direction thereof, and an arcuate recessed face formed between an end face of one short side of the plate-like portion and an end face that continues the end face on a side of the standing wall portion;

an end portion on a side of another long side of the plate-like portion expands toward outside of a locking planar portion of said standing wall portion;

and the plate-like portions of the second seal piece face each other and are connected to both corners of a lower end of the first seal piece at an end portion of the standing wall portion.

13. The rotational damper as claimed in claim 2, wherein said lip seal is mounted to the rotary vane such that:

standing wall portions of the second seal pieces are engaged with locking longitudinal grooves formed on upper and lower surfaces of the one rotary vane and locking longitudinal grooves formed on upper and lower surfaces of the other rotary vane of the pair of rotary vanes respectively;

arcuate recessed faces formed over an end face on the side of one short side of a plate-like portion and an end face of the standing wall portion continuing the end face are engaged with an outer circumferential face of a band-like cylindrically projecting portion of the rotation body;

and an arcuate recessed face on the inner surface of the first seal piece is engaged with an arcuate projecting face on the end face of the rotary vane and the arcuate projecting face on the end face of the rotary vane;

and an arcuate projecting face of the outer face of the first seal piece, an arcuate projecting face on the end face of the rotary vane, and the arcuate projecting face on an end face of the arcuate projecting face of the end face of the rotary vane are formed to be continuous arcuate projecting faces.

14. The rotational damper as claimed in claim 3, wherein said lip seal is mounted to the rotary vane such that:

standing wall portions of the second seal pieces are engaged with locking longitudinal grooves formed on upper and lower surfaces of the one rotary vane and locking longitudinal grooves formed on upper and lower surfaces of the other rotary vane of the pair of rotary vanes respectively;

arcuate recessed faces formed over an end face on the side of one short side of a plate-like portion and an end face of the standing wall portion continuing the end face are engaged with an outer circumferential face of a band-like cylindrically projecting portion of the rotation body;

and an arcuate recessed face on the inner surface of the first seal piece is engaged with an arcuate projecting face on the end face of the rotary vane and the arcuate projecting face on the end face of the rotary vane;

and an arcuate projecting face of the outer face of the first seal piece, an arcuate projecting face on the end face of the rotary vane, and the arcuate projecting face on an end face of the arcuate projecting face of the end face of the rotary vane are formed to be continuous arcuate projecting faces.

15. The rotational damper as claimed in one of claim 2, wherein said check valve mechanism comprises a curved concave groove formed on each of the pair of partition portions, and a check valve engaged with the curved concave groove so as to be movable along the curved concave groove.

16. The rotational damper as claimed in one of claim 3, wherein said check valve mechanism comprises a curved concave groove formed on each of the pair of partition portions, and a check valve engaged with the curved concave groove so as to be movable along the curved concave groove.

17. The rotational damper as claimed in one of claim 4, wherein said check valve mechanism comprises a curved concave groove formed on each of the pair of partition portions, and a check valve engaged with the curved concave groove so as to be movable along the curved concave groove.

18. The rotational damper as claimed in claim 6, wherein said check valve comprises:

a band-plate-like base portion having an inner curved concave face portion and an outer curved convex face portion that are curved with a same curvature center on both sides of one face in a longitudinal direction thereof;

a standing wall portion standing on one end portion of one face of the base portion along a width direction; a pair of projecting portions standing on another end portion of the one face of the base portion so as to oppose with each other in a width direction;

and an even flat face portion formed on another face in a longitudinal direction.

19. The rotational damper as claimed in claim 2, wherein said check valve mechanism is constructed such that:
the inner curved concave face portion of the band-plate-like base portion of the check valve slidably contacts with the inner curved convex wall face of the curved concave groove of the partition portion;
the outer curved convex face portion slidably contacts with the outer curved concave wall face of the curved concave groove of the partition portion;
the standing wall portion covers and contacts with end faces of a pair of locking projecting portions of the curved concave groove of the partition portion;
and an even flat face portion is flush with an upper surface of the partition portion and is engaged with the curved concave groove of the partition portion.

20. The rotational damper as claimed in claim 3, wherein said check valve mechanism is constructed such that:
the inner curved concave face portion of the band-plate-like base portion of the check valve slidably contacts with the inner curved convex wall face of the curved concave groove of the partition portion;
the outer curved convex face portion slidably contacts with the outer curved concave wall face of the curved concave groove of the partition portion;
the standing wall portion covers and contacts with end faces of a pair of locking projecting portions of the curved concave groove of the partition portion;
and an even flat face portion is flush with an upper surface of the partition portion and is engaged with the curved concave groove of the partition portion.

* * * * *